US008339692B2

(12) United States Patent
Uotani et al.

(10) Patent No.: US 8,339,692 B2
(45) **Date of Patent: *Dec. 25, 2012**

(54) PRINTING CONTROL APPARATUS AND PRINTING CONTROL METHOD

(75) Inventors: Kenichiro Uotani, Chiba-ken (JP); Yoshiaki Tomomatsu, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,401

(22) Filed: Feb. 13, 2012

(65) Prior Publication Data

US 2012/0147399 A1 Jun. 14, 2012

Related U.S. Application Data

(63) Continuation of application No. 12/610,248, filed on Oct. 30, 2009, now Pat. No. 8,139,276, which is a continuation of application No. 11/159,265, filed on Jun. 23, 2005, now Pat. No. 7,633,659.

(30) Foreign Application Priority Data

Jun. 25, 2004 (JP) ................................ 2004-188380

(51) Int. Cl.
*G03F 3/10* (2006.01)

(52) U.S. Cl. ......... 358/527; 358/1.9; 382/162; 382/167; 345/590; 345/600

(58) Field of Classification Search ........................ None
See application file for complete search history.

(56) References Cited

U.S. PATENT DOCUMENTS

| | | | | |
|---|---|---|---|---|
| 5,467,434 | A * | 11/1995 | Hower et al. | 358/1.15 |
| 6,375,297 | B1 * | 4/2002 | Hayashi et al. | 347/14 |
| 6,587,129 | B1 | 7/2003 | Lavendel et al. | |
| 6,876,463 | B2 * | 4/2005 | Livingston | 358/1.15 |
| 6,924,826 | B1 | 8/2005 | Nakagiri et al. | |
| 7,088,466 | B1 | 8/2006 | Tomomatusu | |
| 7,307,743 | B2 | 12/2007 | Watanabe | |
| 2001/0026293 | A1 | 10/2001 | Kaneko | |
| 2002/0065807 | A1 | 5/2002 | Kawamoto et al. | |
| 2003/0074435 | A1 * | 4/2003 | Hobbs | 709/223 |

(Continued)

FOREIGN PATENT DOCUMENTS

JP 2000-227847 A 8/2000

(Continued)

OTHER PUBLICATIONS

Office Action, dated Jul. 11, 2011, in JP 2004-188380.

*Primary Examiner* — Marivelisse Santiago Cordero
*Assistant Examiner* — Miya J Cato
(74) *Attorney, Agent, or Firm* — Fitzpatrick, Cella, Harper & Scinto

(57) ABSTRACT

The invention provides a printing control apparatus having a function for performing preview displaying prior to printing document data outputted by an application program. The apparatus comprises: a generator for generating a preview image based on the document data in accordance with a print setting; and a preview display controller for displaying, together with the preview image, a user interface which displays an option in a predetermined item of a print setting within a scope corresponding to a current print setting, when the predetermined item of the print setting corresponding to the preview image is to be changed. The printing control apparatus enables printing of the document data in accordance with the print setting changed through the user interface.

9 Claims, 27 Drawing Sheets

U.S. PATENT DOCUMENTS

| | | | | |
|---|---|---|---|---|
| 2003/0112456 | A1 | 6/2003 | Tomita et al. | |
| 2003/0117639 | A1 | 6/2003 | Milton | |
| 2003/0202808 | A1* | 10/2003 | Katamoto | 399/45 |
| 2004/0051903 | A1 | 3/2004 | Lapstun et al. | |
| 2004/0088654 | A1 | 5/2004 | Uotani | |
| 2004/0105120 | A1 | 6/2004 | Yokoyama | |
| 2005/0094200 | A1 | 5/2005 | Uekusa et al. | |
| 2005/0200879 | A1 | 9/2005 | Nakagiri et al. | |
| 2010/0046048 | A1* | 2/2010 | Uotani et al. | 358/527 |

FOREIGN PATENT DOCUMENTS

| | | | |
|---|---|---|---|
| JP | 2001-134407 | A | 5/2001 |
| JP | 2003-050921 | A | 2/2003 |
| JP | 2003-167721 | A | 6/2003 |
| JP | 2003-280871 | A | 10/2003 |
| JP | 2004-005241 | A | 1/2004 |
| JP | 2004-102618 | A | 4/2004 |

* cited by examiner

| |
|---|
| PLAIN PAPER |
| PROFESSIONAL PHOTO PAPER |
| SUPER PHOTO PAPER |
| DOUBLE SIDES OF SUPER PHOTO PAPER |
| MATTE PHOTO PAPER |
| GLOSSY PAPER |
| HIGH-QUALITY SPECIALTY PAPER |
| POSTCARD FOR INKJET PRINTER |
| POSTCARD |
| T-SHIRT TRANSFER PAPER |
| OHP FILM |
| ENVELOPES |

302

| |
|---|
| PROFESSIONAL PHOTO PAPER |
| SUPER PHOTO PAPER |
| DOUBLE SIDES OF SUPER PHOTO PAPER |
| MATTE PHOTO PAPER |
| GLOSSY PAPER |
| POSTCARD FOR INKJET PRINTER |
| POSTCARD |
| PLAIN PAPER |

303

| |
|---|
| PLAIN PAPER |
| DOUBLE SIDES OF SUPER PHOTO PAPER |
| POSTCARD |

601

600

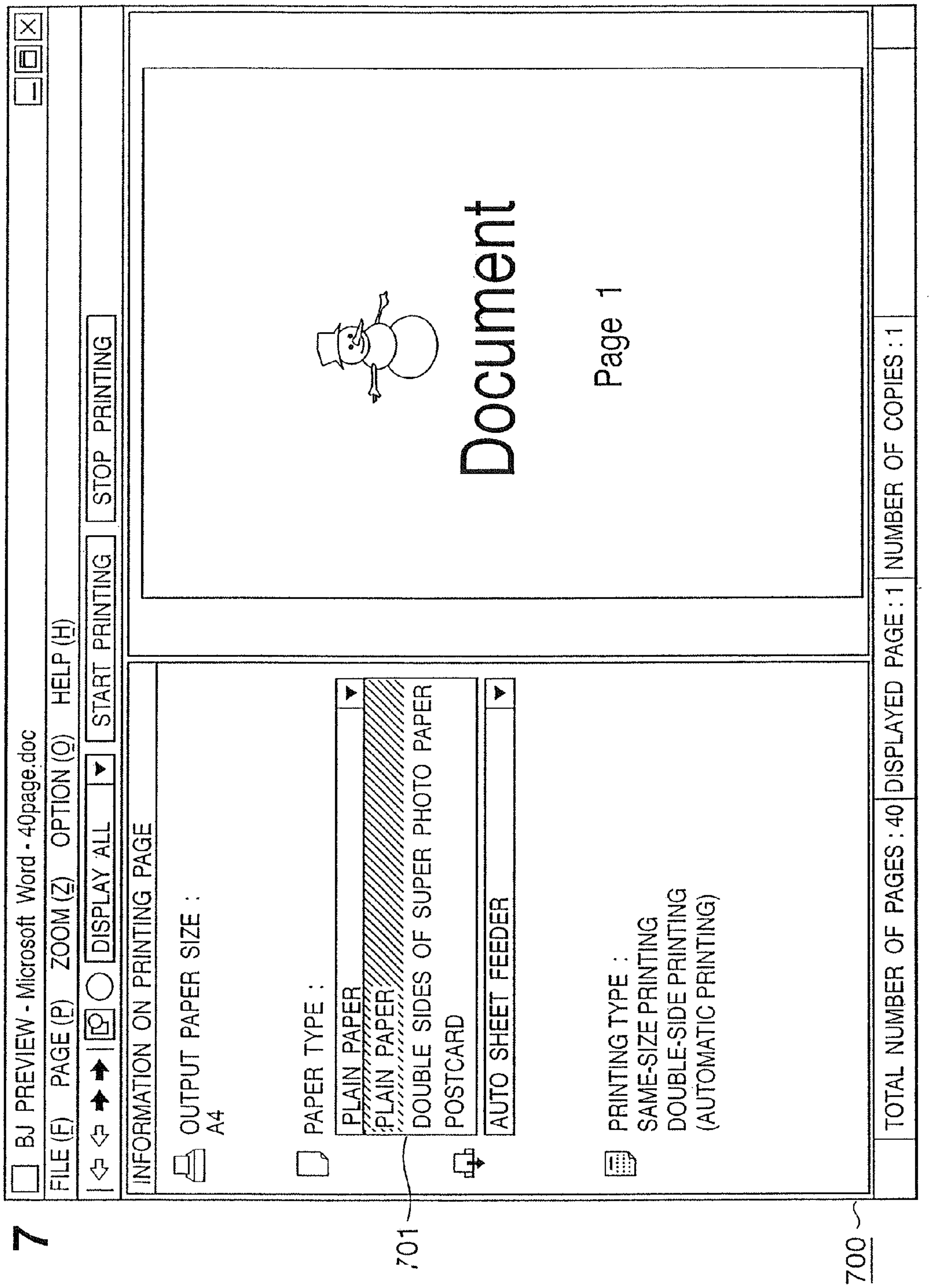

FIG. 7

BJ PREVIEW - Microsoft Word - 40page.doc
FILE (F)   PAGE (P)   ZOOM (Z)   OPTION (O)   HELP (H)
DISPLAY ALL   START PRINTING   STOP PRINTING

INFORMATION ON PRINTING PAGE

OUTPUT PAPER SIZE :
A4

PAPER TYPE :
PLAIN PAPER
PLAIN PAPER
DOUBLE SIDES OF SUPER PHOTO PAPER
POSTCARD

AUTO SHEET FEEDER

PRINTING TYPE :
SAME-SIZE PRINTING
DOUBLE-SIDE PRINTING
(AUTOMATIC PRINTING)

Document

Page 1

TOTAL NUMBER OF PAGES : 40 | DISPLAYED PAGE : 1 | NUMBER OF COPIES : 1

701

700

F I G. 10A
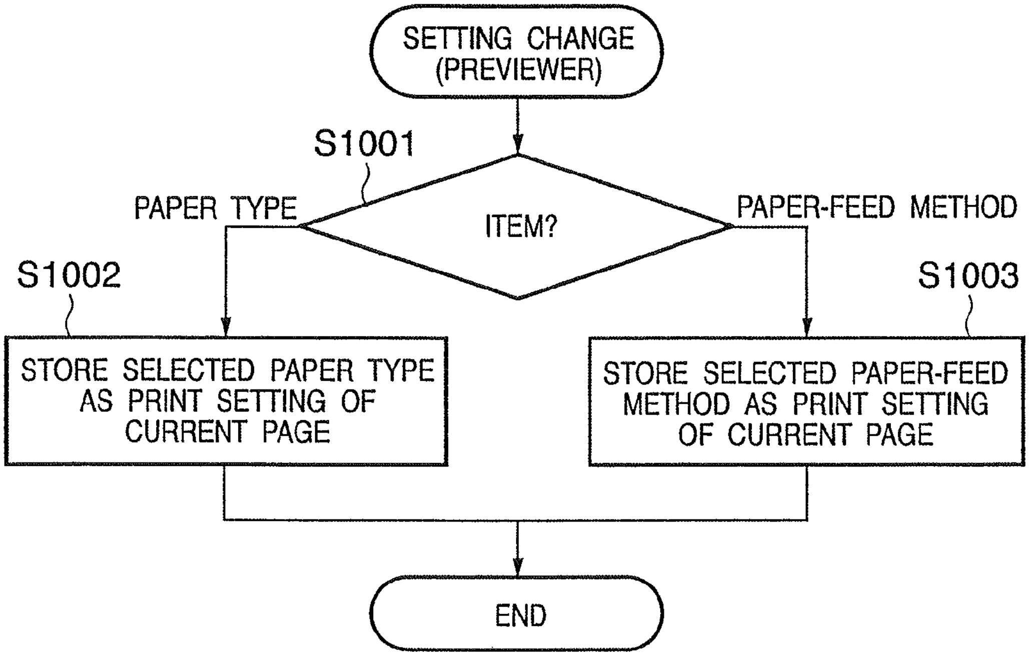
F I G. 10B
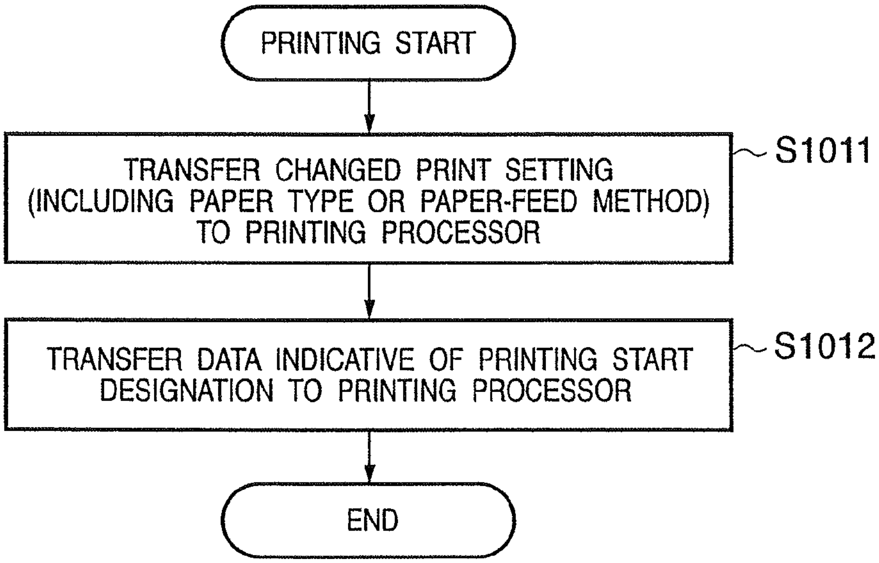

| PRIORITY RANK | PRINT SETTING ITEM |
|---|---|
| 1 | PAPER TYPE |
| 2 | PAPER-FEED METHOD |

| PAPER TYPE | MOST APPROPRIATE PAPER-FEED METHOD |
|---|---|
| PLAIN PAPER | CASSETTE |
| PROFESSIONAL PHOTO PAPER | AUTO SHEET FEEDER |

| PAPER TYPE | COLOR PROFILE |
|---|---|
| PLAIN PAPER | Profile_A. icm |
| PROFESSIONAL PHOTO PAPER | Profile_B. icm |
| SUPER PHOTO PAPER | Profile_B. icm |
| DOUBLE SIDES OF SUPER PHOTO PAPER | Profile_B. icm |
| MATTE PHOTO PAPER | Profile_C. icm |
| GLOSSY PAPER | Profile_B. icm |
| HIGH-QUALITY SPECIALTY PAPER | Profile_C. icm |
| POSTCARD FOR INKJET PRINTER | Profile_C. icm |
| POSTCARD | Profile_A. icm |
| T-SHIRT TRANSFER PAPER | Profile_D. icm |
| OHP FILM | Profile_D. icm |
| ENVELOPES | Profile_A. icm |

PRINTING CONTROL APPARATUS AND PRINTING CONTROL METHOD

This application is a continuation of U.S. application Ser. No. 12/610,248 filed Oct. 30, 2009 (now U.S. Pat. No. 8,139, 279 allowed) which is a continuation of U.S. application Ser. No. 11/159,265, filed Jun. 23, 2005, issued as U.S. Pat. No. 7,633,659 on Jun. 23, 2005, the contents of each of which are incorporated herein by reference.

FIELD OF THE INVENTION

The present invention relates to a printing control apparatus and a printing control method for displaying a print preview that shows a printout in the form according to a print setting, prior to actually printing the printing data, e.g., a document.

BACKGROUND OF THE INVENTION

Conventionally, document data including documents, graphics, or images edited by a text editing or image editing application program in a data processing apparatus such as a personal computer is printed out by a printer. In this case, a print execution command for print execution is transmitted from the data processing apparatus to the printer. Prior to this process, a print preview function is available in the data processing apparatus. According to the print preview function, display data for showing a print result is generated by analyzing the document data and a print setting, and the display data is displayed in advance. In a case where the print preview function is provided only by an application program, a print preview cannot be displayed with respect to document data generated by an application program that does not have a print preview function.

In view of this, a print preview function is provided by a system program that offers functions to an application program, thereby realizing a print preview that does not depend on functions of the application program. The system program is provided as a module of a printer driver, and has a function for outputting a content rendered by a rendering module of the printer driver or a rendering module (called a printing processor) of an operating system (OS) to a display unit as a print preview (refer to Japanese Patent Application Laid-Open No. 2003-167721 and No. 2004-102618). In the following specification, such print preview function provided without depending on an application program will be referred to as a print preview or a print preview function. In a case where the print preview function provided by a system program needs to be distinguished from a print preview function of a specific application program, the print preview provided by the system program will be referred to as a general-purpose print preview function.

The aforementioned conventional general-purpose print preview is realized, for instance, in a printing procedure following a printing designation made by a user from an application program.

By virtue of utilizing the conventional print preview, a user can confirm a print result before document data generated by an application program is printed by a printer. To print data generated by an application program or the like, a user must correctly make print setting on a paper size and a paper type on which actual printing is to be performed, a paper-feed method and so forth, then execute printing.

Although, in general, a paper size can easily be set by an application program, a paper type and a paper-feed method cannot be set generally on a print setting screen provided by an application program despite the fact that the setting is frequently made. Instead, the setting on a paper type and a paper-feed method must be made by opening a user interface in a printing property of a printer driver from the application program. Therefore, there are often cases that a user executes printing before a correct setting is made.

Furthermore, during print preview displaying, there is no step of confirming the print-setting contents set by an application program. Even if the print-setting contents can be confirmed during print preview displaying, the print-setting contents cannot be changed. Therefore, if a user realizes an error in the print setting during the print preview displaying, the user has to terminate the print processing once, then correct the print setting, and execute printing again.

In view of the above situation, upon print preview displaying by the printer driver, there are demands for changing the print setting without terminating the print processing. However, in a case of a printer driver of a raster-scanning printer such as an inkjet printer or a host-base printer, image processing has already been performed to a certain degree at the time of print preview, and therefore, a print setting that can be set through a user interface of a printer driver cannot be changed arbitrarily.

SUMMARY OF THE INVENTION

The present invention has been proposed in view of the above-described conventional art, and has as its object to provide a printing control apparatus and a printing control method which can offer a user-friendly print preview function that enables a user to confirm a print preview as well as print-setting contents and, if necessary, enables the user to change the print-setting contents.

In order to attain the above object, the present invention has the following configuration. More specifically, the present invention provides a printing control apparatus having a function for performing preview displaying prior to printing document data outputted by an application program, comprises: a generator for generating a preview image based on the document data in accordance with a print setting; and a preview display controller for displaying, together with the preview image, a user interface which displays an option in a predetermined item of a print setting within a scope corresponding to the current print setting, when the predetermined item of the print setting corresponding to the preview image is to be changed, wherein the printing control apparatus enables printing of the document data in accordance with the print setting changed through the user interface.

By virtue of the above-described configuration, when a print preview is displayed, a user is able to confirm, together with a print result, print-setting contents set by an application program or the like.

Furthermore, the print setting can be changed without terminating the print processing, and printing can be executed with the changed setting.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of an option list information table for paper types;

FIG. 7 is a view showing an example of a print preview screen displayed on the display device, in a case where a printing type is set in "same-size printing" and "double-side printing";

FIGS. 10A and 10B are flowcharts showing a procedure of the previewer at the time of changing the setting and at the time of printing start;

FIG. 16 is a view showing an example of a print-setting priority rank data table;

FIG. 18 is a view showing an example of a most appropriate setting data table with respect to paper-feed methods;

FIG. 23 is a table showing color profile names employed in respective paper types upon color processing of the printing system;

DETAILED DESCRIPTION OF THE PREFERRED EMBODIMENTS

First Embodiment

Hereinafter, preferred embodiments of the present invention are described in detail in accordance with the accompanying drawings. The present invention is applied to, for instance, a printing system 100 shown in FIG. 1. The printing system according to the present embodiment is configured so as to display a print preview on a display device 104 before a printer 102 prints out on a piece of paper printing data such as documents and images generated by an application program that can be started by a personal computer or the like. Hereinafter, a construction and an operation of the printing system 100 according to the present embodiment are described in detail.

<Overall Construction of Printing System 100>

Figure 1:
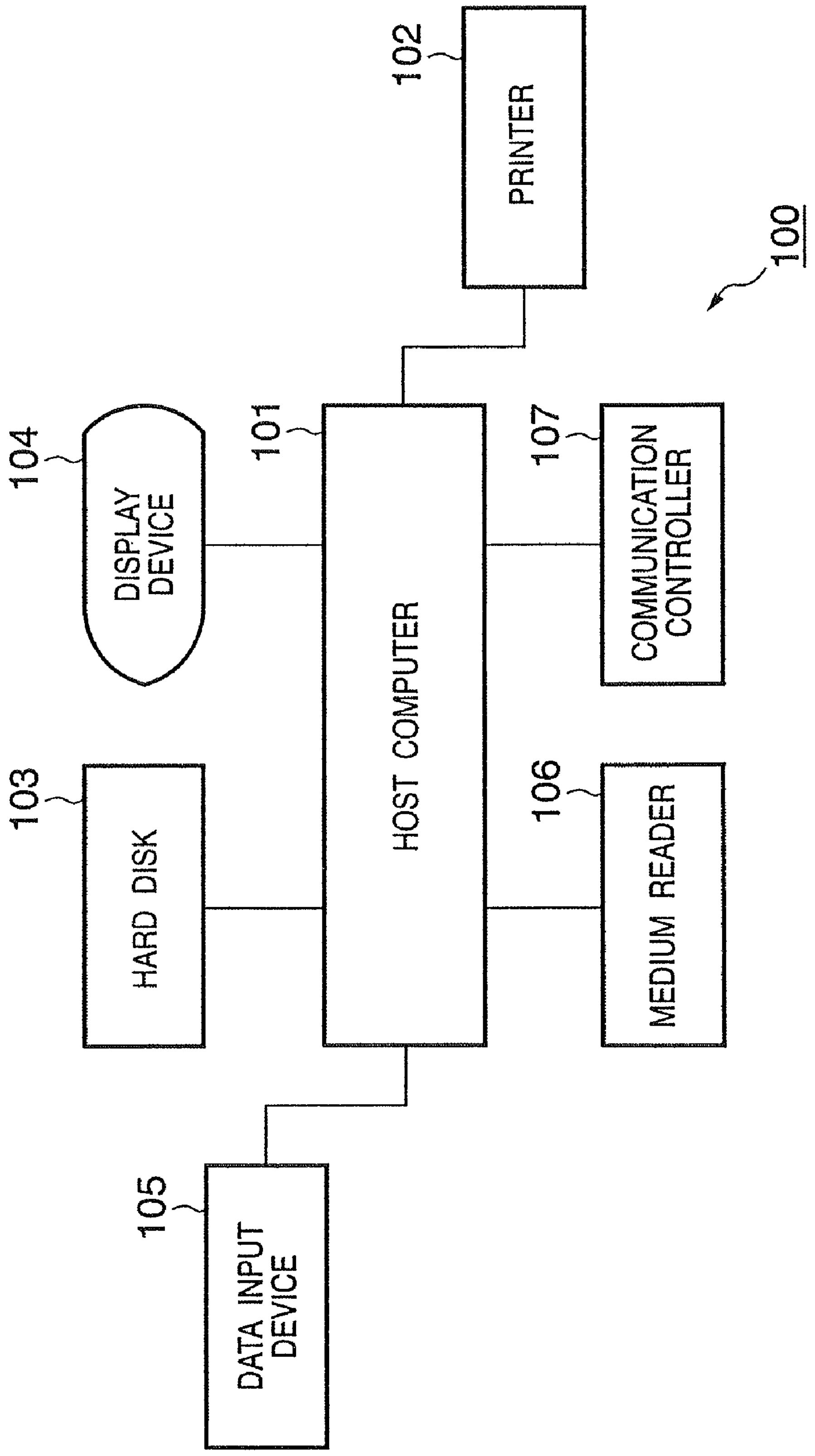
FIG. 1 is a block diagram showing a brief construction of a printing system according to an embodiment of the present invention.

In the printing system 100, as shown in FIG. 1, a printer 102, a hard disk 103, a display device 104, a data input device 105, a medium reader 106, and a communication controller 107 are respectively connected to a host computer 101.

The host computer 101 monitors and controls overall operation of the printing system 100 by executing a predetermined system program. More specifically, the host computer 101 comprises a CPU (Central Processing Unit), RAM (Random Access Memory), ROM (Read Only Memory) or the like on a system board, which will be described later. The CPU reads a necessary processing program out of an internal memory or the external hard disk 103 or the like and executes the program, thereby controlling the overall operation of the printing system 100. In this embodiment, for instance, the hard disk 103 is used as a storage destination of various programs executed by the host computer 101. Stored in the hard disk 103 is a processing program for realizing an operation according to the present embodiment, various application programs for generating print-target data, a printer driver for generating printing data, and so forth.

Note that the storage destination of the processing program (program codes) for realizing the operation according to the present embodiment is not limited to the hard disk 103 or an internal memory. The processing program may be recorded in a portable recording medium, e.g., a CD-ROM or a flexible disk. The processing program recorded in a portable recording medium in a form readable by the host computer 101 may be distributed, and on the occasion of constructing the printing system 100, the processing program may be read by the host computer 101 via the medium reader 106 or the communication controller 107 and installed in the hard disk 103. Moreover, although the present embodiment assumes that Windows (registered trademark) is used as an operating system (OS) of the host computer 101, the present invention is not limited to this.

When the printer 102 receives information such as a print setting or the like along with printing data from the host computer 101, the printer 102 executes a predetermined printing process, thereby outputting (image formation) the printing data on printing paper.

For the printer 102, various printers such as a serial printer, a page printer, or other electrophotographic printers can be applied. The printing data transmitted from the host computer 101 to the printer 102 has a form processable by the printer 102. For instance, for a printer capable of interpreting and executing a page description language, printing data described in a page description language is transmitted. For a printer capable of processing bitmap data only, bitmap data is transmitted as printing data. The present embodiment assumes that the printer 102 is an inkjet printer that receives and prints bitmap data. Furthermore, the printer 102 and the host computer 101 may be connected in various forms, e.g., stand-alone connection, network connection, and so on.

In response to a designation of the host computer 101 executed by a system program or an application program, the display device 104 displays a predetermined dialogue window. Further, the display device 104 displays a print preview, which is the feature of the present embodiment, in accordance with a designation of the host computer.

The data input device 105, including a keyboard, a mouse, and other pointing devices, receives various commands from a user and transfers the commands to the host computer 101. The data input device 105 transfers a print setting for the printer 102 and a print preview condition (hereinafter referred to as a "preview condition"), inputted by a user, to the host computer 101. A user interface for changing the print setting or the like can be provided to a user by a dialogue window displayed on the display device 104 working together with the data input device 105.

The medium reader 106, including a CD-ROM drive, a flexible disk (FD) drive or the like, supplies the host computer 101 with information read out of the recording medium such as a CD-ROM, an FD or the like.

The communication controller 107 is a connection interface for enabling communication between, for instance, the printing system 100 and an external network. The printer 102 may be connected to the host computer 101 via the communication controller 107 or via a network.

<Functional Configuration of Printing System 100>

Figure 2:
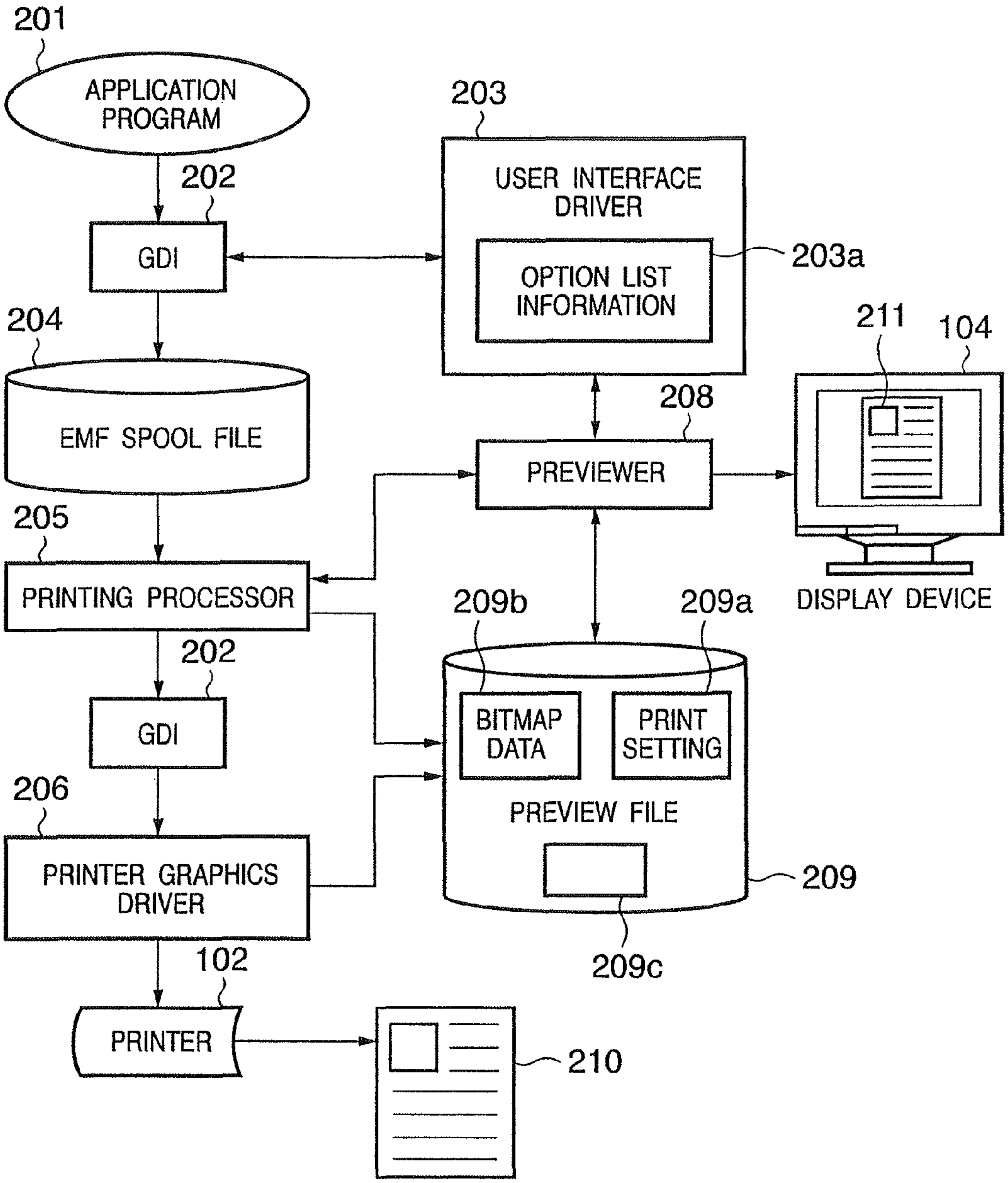
FIG. 2 is a block diagram showing in particular the printing control function among functions of the printing system realized by executing a predetermined processing program by a host computer according to the embodiment of the present invention.

FIG. 2 is a block diagram showing in particular the printing control function among functions of the printing system 100 realized by executing a predetermined processing program by the host computer 101. The printing control function of the host computer 101 is realized by an application program 201, a graphics device interface (GDI) 202, a user interface driver 203, an EMF spool file 204, a printing processor 205, a printer graphics driver 206, a previewer 208, and a preview file 209 as shown in FIG. 2. In FIG. 2, while the GDI 202 and the EMF spool file are program modules provided by an operating system, the application program 201 is a program in general which has a function for generating data having images, texts, graphics or the like to be printed (such data will comprehensively be referred to as document data. In a case where the document data is outputted for printing, the outputting document data may be referred to as print-target data.).

First described is the main function included in the printing control function of the host computer 101. The user interface driver 203 has a function for making a print setting for the printer 102 through the GDI 202. More specifically, the user interface driver 203 has a function for setting the size and type of paper used in printing, a paper-feed method for feeding paper to be outputted, and other printing conditions. Also, the user interface driver 203 has a function for setting whether or not to display a print preview on the display device 104 prior to print execution. Assume herein that the user interface driver 203 has made a setting to display a print preview on the display device 104 prior to print execution. Note that the function for displaying the print-setting contents together with the print preview and the function that enables changes in the print-setting contents are provided by the previewer 208.

The printing processor 205 has a function for processing in page unit the print-target data stored in the EMF spool file 204 and a function for starting the previewer 208.

The printer graphics driver 206 has a function for converting the print-target data to bitmap data that can be outputted by the printer 102.

The previewer 208 has a function for displaying print preview data (preview image data) 211, which is stored in the preview file 209, on the display device 104, and a function for changing a print setting.

The preview file 209, which is a file temporarily generated for displaying a print preview on the display device 104, includes print preview data (preview image data) 209*b*, print setting data 209*a*, preview condition data 209*c*, and so on.

<Preview Processing>

Next, a series of operation for the printing control function of the host computer 101 is described with reference to FIGS. 2 and 11. Hereinafter, numerals within the parentheses are reference numerals shown in FIG. 11. A description on GDI is omitted in FIG. 11.

The application program 201 generates an arbitrary document in accordance with an operation designation by a user, and designates print execution of the document data (print-target data). Then, the GDI 202 notifies the user interface driver 203 of a printing-start event (1101). In response to the notification of the printing-start event, the user interface driver 203 stores print setting data (including default setting) of the printer 102, which has been set by the user in advance, in the spool file 204 (1102).

Subsequent to the above process, or not in synchronization with the above process, the application program 201 stores the document data (print-target data) in the EMF spool file 204 through the GDI 202 (1103).

The printing processor 205 acquires the print setting data and the print-target data from the EMF spool file 204 (1104). If the acquired print setting data includes information that indicates execution of "preview display," the previewer 208 is started (1105). The printing processor 205 acquires preview conditions, e.g., a page number subjected to print preview displaying on the display device 104, a preview image resolution used in the print preview displaying, and so on, through communication between the printing processor 205 and the previewer 208 (1106). The page number is a number designated by a user as a preview target, or a default page number (e.g., 1). The preview image resolution is, for instance, a resolution of the display device 104. If the resolution of the display device 104 coincides with the resolution of the preview image, the preview image can be displayed in the actual printing size.

The printing processor 205 acquires from the EMF spool file 204 the print setting data corresponding to the acquired page number (1107), and stores the data in the preview file 209 (1108). Further, the printing processor 205 notifies the printer graphics driver 206 through the GDI 202 of the file name of the preview file 209 (hereinafter referred to as a "preview file name"), the print setting data, and the preview conditions (1109). Thereafter, the printing processor 205 acquires the print-target data from the EMF spool file 204 (1110), generates print-target data corresponding to the acquired page number (hereinafter referred to as "print-target page data") based on the print-target data, and supplies the generated data to the GDI 202 (1111). The GDI 202 generates a graphics rendering command based on the print-target page data, and supplies it to the printer graphics driver 206. Moreover, the printing processor 205 notifies the previewer 208 of the preview file name (1115).

The printer graphics driver 206 generates bitmap data for print preview displaying (hereinafter referred to as "preview image data") (1112) from the print-target page data supplied by the printing processor 205, based on the graphics rendering command generated by the GDI 202 according to the print-target page data, and the print setting data as well as the preview conditions notified by the printing processor 205 in advance (numeral 1109).

Note herein that in a case of performing printing by the printer 102, the printer graphics driver 206 generates bitmap data (hereinafter referred to as "printing image data") instead of preview image data. When the printing image data is generated by the printer graphics driver 206, the printer graphics driver 206 supplies the printing image data to the printer 102 through a data transmission unit (not shown). The printer 102 prints the printing image data supplied by the printer graphics driver 206 on the paper 210.

In contrast, when preview image data is generated by the printer graphics driver 206, the printer graphics driver 206 stores the preview image data 209*b* in the preview file 209 (1114) based on the preview file name notified by the printing processor 205 in advance (numeral 1109).

The previewer 208 receives setting of the preview conditions from the user as mentioned above, and requests the printing processor 205 to generate a preview file 209 that is suitable to the set preview conditions (1106). In response, when the previewer 208 receives a preview file name of the preview file 209 from the printing processor 205 (1115), the previewer 208 acquires preview image data from the preview file 209 (1116), and displays a print preview 211 of the preview image data on the display device 104 based on the acquired preview conditions 209*c* (1117).

Furthermore, the previewer 208 acquires print setting data 209*a* from the preview file 209 (1118), and displays print-setting contents on the display device 104 (1119). Also, the previewer 208 notifies the user interface driver 203 of the acquired print setting data and inquires the user interface driver 203 about a list of options that can be selected by a user with respect to each print setting (hereinafter referred to as "option list information") (1120).

When the user interface driver 203 receives an inquiry about option list information from the previewer 208, the user interface driver 203 refers to an option list information table 203*a*, which is internally stored in advance, based on the notified print setting data, and notifies the previewer 208 of the option list information for the current print setting (1121).

The previewer 208 displays a list of options that can be selected by a user with respect to each print setting on the display device 104 based on the option list information notified by the user interface driver 203, and receives changes in the print setting from the user (1122). The processing procedure by the previewer in reference numerals 1118 to 1122 in FIG. 11 is described later with reference to FIG. 9.

Thereafter, when a printing start designation is inputted on the user interface screen displayed by the previewer (1123), printing is performed, for instance, in the following procedure. The previewer 208 transfers the printing start designation as well as the changed print setting data to the printing processor 205 (1124). The printing processor 205 transfers the changed print setting data to the printer graphics driver 206 (1125). Since the printer graphics driver 206 already has the print setting data (1109), the changed part is updated. The printing processor 205 reads the print-target data out of the EMF spool file 204 (1126), and transfers the printing page data to the printer graphics driver 206 (1127). The printer graphics driver 206 generates a printer command based on the printing page data (1127). Note that the printing page data transferred to the printer graphics driver 206 has been converted to a graphic command through the GDI. Further, the printer command generated by the printer graphics driver 206 has a bitmap-data form for printing according to the present embodiment.

<Option List Information Table>

FIG. 3 shows an example of an option list information table for paper types among the option list information table 203*a* stored in the user interface driver 203.

In FIG. 3, the table 301 shows a list of options that can be set in the item "paper type" in a case where the set value of the item "printing type" included in the print setting data is "same-size printing." The table 302 shows a list of options that can be set in the item "paper type" in a case where the set value of the item "printing type" is "borderless full-page printing." Note that borderless printing is to print an image on the entire surface of a printing medium without a margin. The table 303 shows a list of options that can be set in the item "paper type" in a case where the set value of the item "printing type" is "double-side printing." These three tables are stored in association with respective setting values "same-size printing," "borderless full-page printing," and "double-side printing" of the "printing type." Note that the "printing type" may not include only one item, but may include plural items. For instance, the present invention is also applicable to a case where the "printing type" includes a combination of three print setting items "double-side printing/single-side printing," "borderless printing," and "scaling factor."

Upon receiving the inquiry about option list information that can be selected by a user along with the data indicative of a printing type (1120), the user interface driver 203 refers to the received setting value of the "printing type." According to the example in FIG. 3, if the received setting value is "same-size printing," the table 301 is returned to the previewer 208. If the received setting value is "borderless full-page printing," the table 302 is returned to the previewer 208. If the received setting value is "double-side printing," the table 303 is returned to the previewer 208 (1121).

<Example of Print Preview Display Screen>

Figure 4:
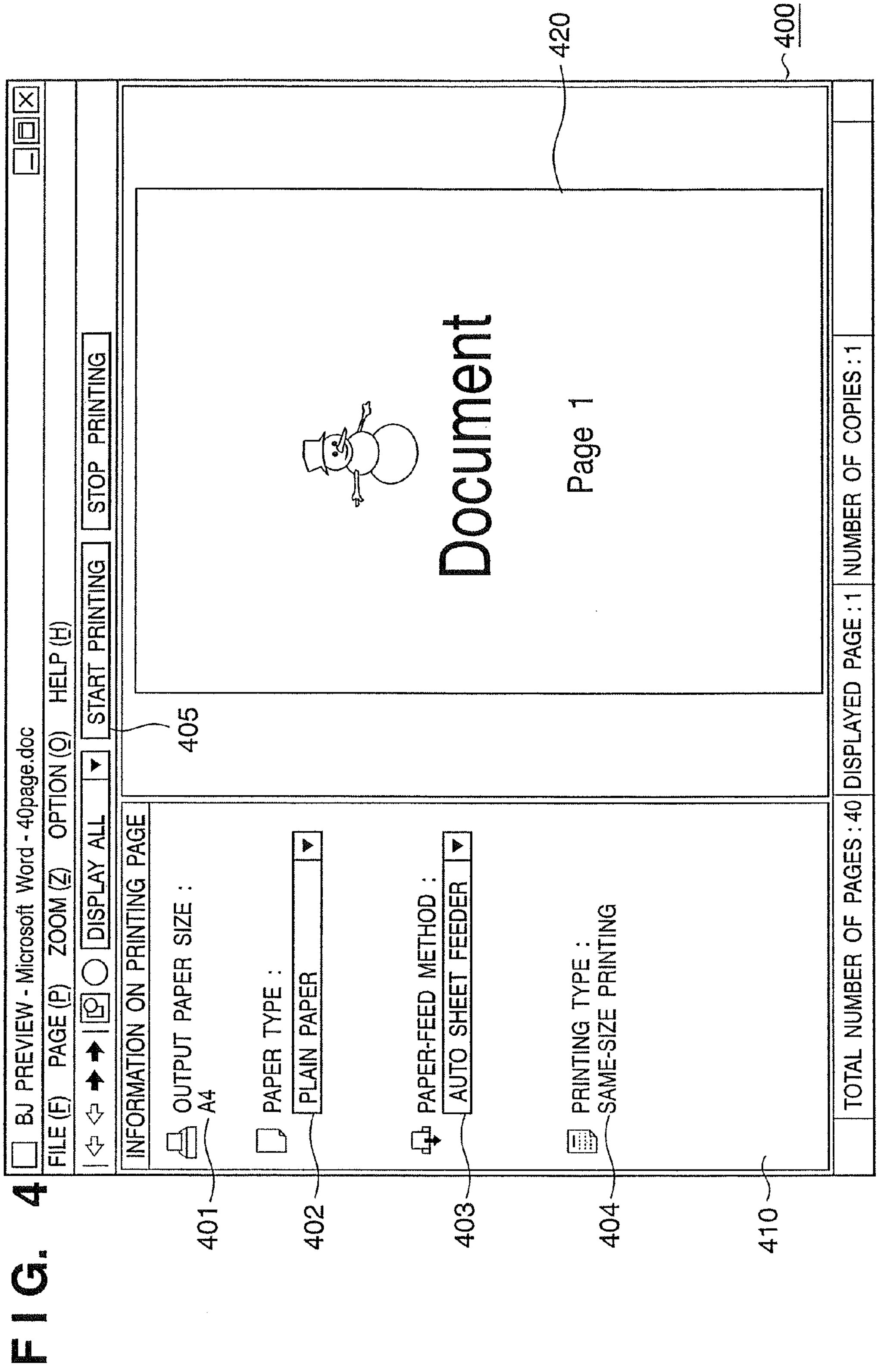
FIG. 4 is a view showing an example of a print preview screen displayed on a display device.

FIG. 4 shows an example of a screen 400 of the print preview 211 displayed on the display device 104 by the previewer 208. On the screen 400 in FIG. 4, the display area 401 indicates a paper size to be adopted when the page currently displayed on the print preview is printed. The setting area 402, which is provided for allowing a user to set a paper type, indicates a paper type to be employed when, the page currently displayed on the print preview is printed. The setting area 403, which is provided for allowing a user to set a paper-feed method, indicates a paper-feed method to be adopted when the page currently displayed on the print preview is printed. The display area 404 indicates a printing type employed at the time of printing the page currently displayed on the print preview. In the foregoing manner, the previewer 208 according to the present embodiment allows a user to change the paper type and the paper-feed method of the print setting, while the preview image 420 is displayed.

Figure 5:
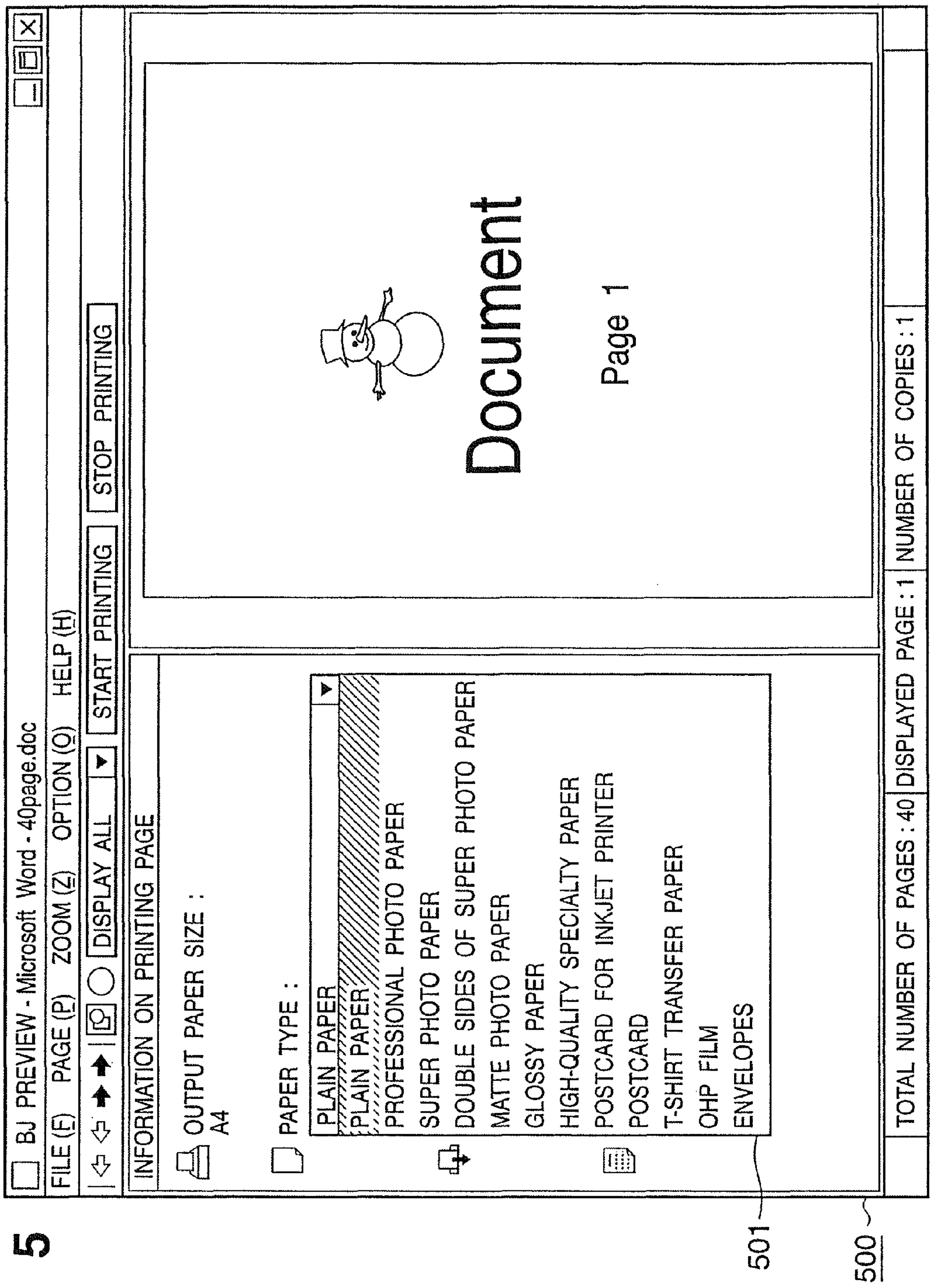
FIG. 5 is a view showing an example of a print preview screen displayed on the display device, in a case where a printing type is set in "same-size printing"

FIG. 5 shows an example of a screen 500 of the print preview 211 displayed on the display device 104 by the previewer 208, in a case where the set value of the item "printing type" is "same-size printing" among the print setting of the page currently displayed on the print preview. On the screen 500 in FIG. 5, the selection area 501 shows a list of options that can be selected by a user with respect to the paper type when the printing type is "same-size printing" among the print setting of the document page currently displayed on the print preview. In accordance with the table 301 shown in FIG. 3, one of the options (from plain paper to envelope) can be selected.

Figure 6:
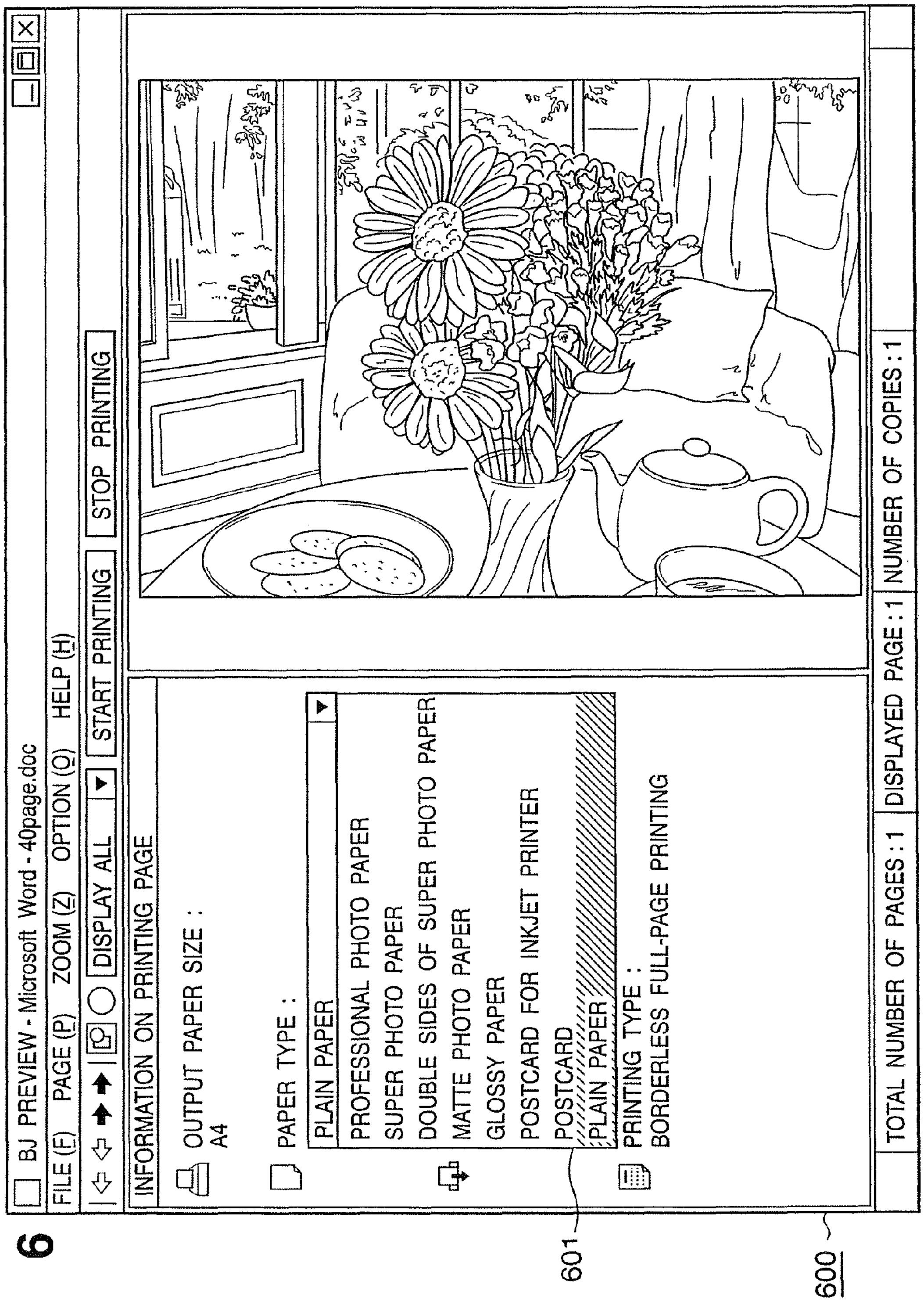
FIG. 6 is a view showing an example of a print preview screen displayed on the display device, in a case where a printing type is set in "borderless full-page printing"

FIG. 6 shows an example of a screen 600 of the print preview 211 displayed on the display device 104 by the previewer 208, in a case where the set value of the item "printing type" is "borderless full-page printing" among the print setting of the page currently displayed on the print preview. On the screen 600 in FIG. 6, the selection area 601 shows a list of options that can be selected by a user with respect to the paper type when the printing type is "borderless full-page printing" among the print setting of the document page currently displayed on the print preview. In accordance with the table 302 shown in FIG. 3, one of the options (from professional photo paper to plain paper) can be selected.

FIG. 7 shows an example of a screen 700 of the print preview 211 displayed on the display device 104 by the previewer 208, in a case where the set value of the item "printing type" is "same-size printing" and "double-side printing" among the print setting of the page currently displayed on the print preview. On the screen 700 in FIG. 7, the selection area 701 shows a list of options that can be selected by a user with respect to the paper type when the printing type is "same-size printing" and "double-side printing" among the print setting of the document page currently displayed on the print preview. In accordance with the common contents in the tables 301 and 303 shown in FIG. 3, one of the options: plain paper, super photo paper, or postcard, can be selected.

Figure 8:
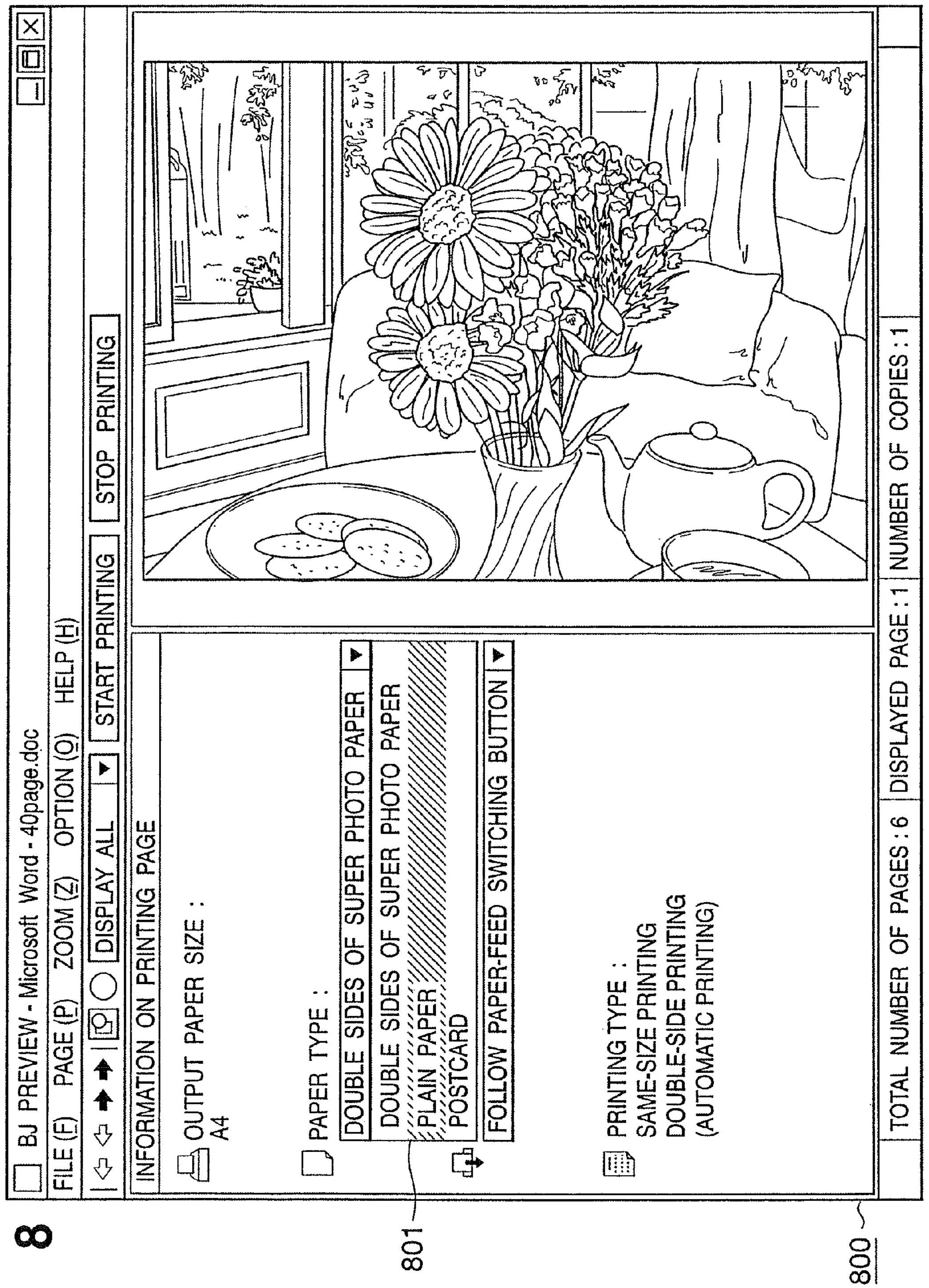
FIG. 8 is a view showing an example of a print preview screen displayed on the display device, in a case where a printing type is set in "borderless full-page printing" and "double-side printing"

FIG. 8 shows an example of a screen 800 of the print preview 211 displayed on the display device 104 by the previewer 208, in a case where the set value of the item "printing type" is "borderless full-page printing" and "double-side printing" among the print setting of the page currently displayed on the print preview. On the screen 800 in FIG. 8, the selection area 801 shows a list of options that can be selected by a user with respect to the paper type when the printing type is "borderless full-page printing" and "double-side printing" among the print setting of the document page currently displayed on the print preview. In accordance with the common contents in the tables 302 and 303 shown in FIG. 3, one of the options: double sides of super photo paper, post card, or plain paper, can be selected.

<Operation of Printing System 100>

Figure 9:
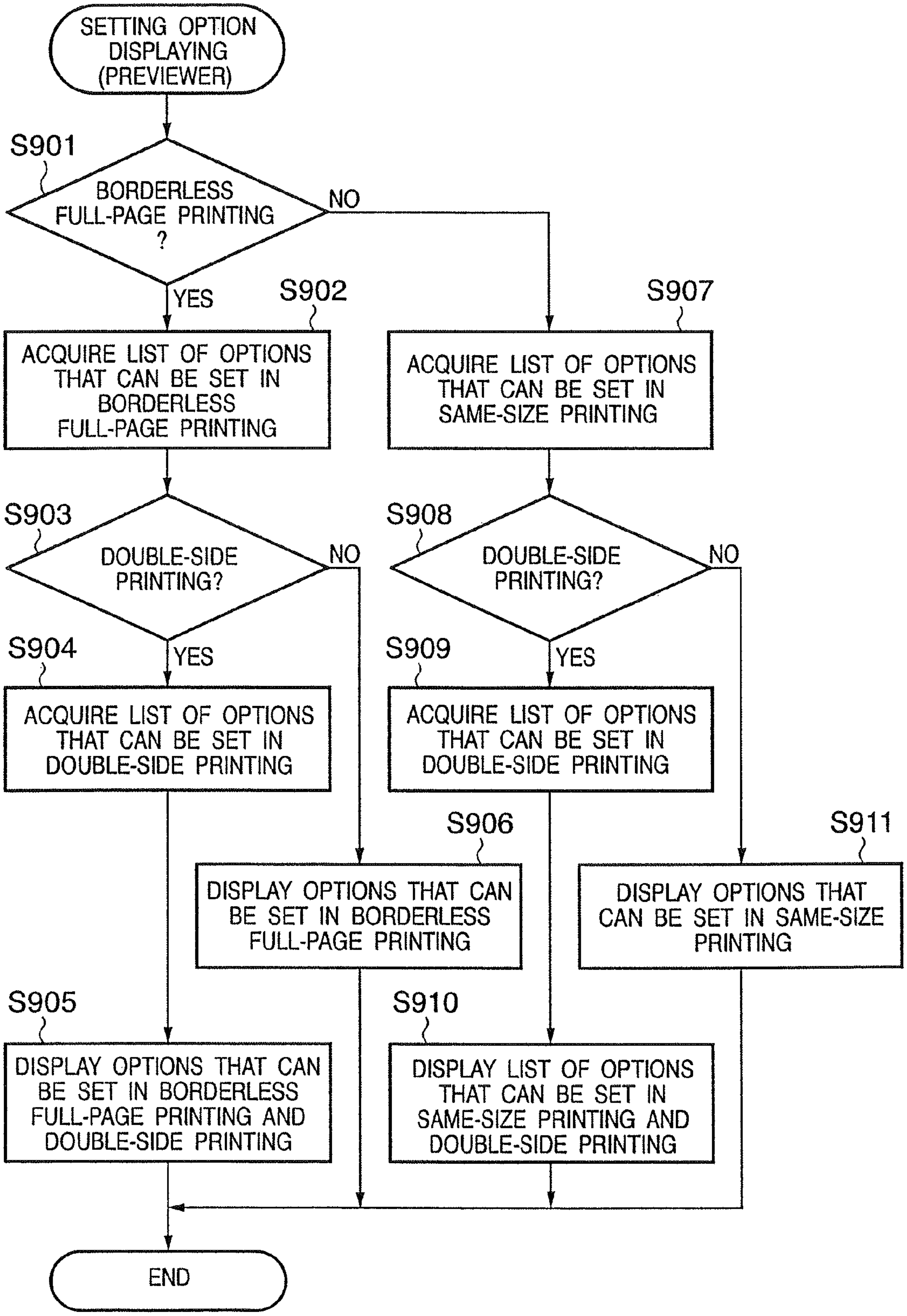
FIG. 9 is a flowchart describing an operation executed when a previewer according to the first embodiment of the present invention displays a list of selectable options upon print preview displaying.

FIG. 9 is a flowchart describing an operation executed when the previewer 208 displays a list of options that can be selected by a user with respect to each print setting on the page currently displayed on the print preview. The procedure in FIG. 9 is executed, for instance, when a user selects a pull-down menu of the selection area 402 on the screen shown in FIG. 4. Note, instead of reading the option list information table each time the list of options is displayed, the table may be read prior to displaying the list of options and may be utilized upon displaying. Note that this flowchart corresponds to numerals 1120 to 1122 in FIG. 11. In the example of FIG. 9, the previewer 208 makes determination on which of the display screens 500 to 800 in FIGS. 5 to 8 is to be displayed.

Step S901: The previewer 208 determines whether or not "borderless full-page printing" is set in the printing type. As a result of the determination, if "borderless full-page printing" is set, the control proceeds to step S902; otherwise, the control proceeds to step S907.

Step S902: When the printing type is "borderless full-page printing," the previewer 208 transfers data indicative of "borderless full-page printing" to the user interface driver 203, and acquires a list of options that can be set with respect to the paper type, i.e., the table 302.

Step S903: The previewer 208 determines whether or not "double-side printing" is set in the printing type. As a result of the determination, if "double-side printing" is set, the control proceeds to step S904; otherwise, the control proceeds to step S906.

Step S904: When the printing type is "double-side printing," the previewer 208 transfers data indicative of "double-side printing" to the user interface driver 203, and acquires a list of options that can be set with respect to the paper type, i.e., the table 303.

Step S905: The previewer 208 extracts options that are commonly included from the list of options on the paper type that can be set when the printing type is "borderless full-page printing" which is acquired in step S902 and the list of options on the paper type that can be set when the printing type is "double-side printing" which is acquired in step S904. Then, the previewer 208 displays the extracted options on the display device 104 (refer to FIG. 8), and ends the control.

Step S906: The previewer 208 displays on the display device 104 (refer to FIG. 6) the list of options on the paper type that can be set when the printing type is "borderless full-page printing" which is acquired in step S902, and ends the control.

Step S907: When the printing type is "same-size printing," the previewer 208 transfers data indicative of "same-size printing" to the user interface driver 203, and acquires a list of options that can be set with respect to the paper type, i.e., the table 301.

Step S908: The previewer 208 determines whether or not "double-side printing" is set. As a result of the determination, if "double-side printing" is set, the control proceeds to step S909; otherwise, the control proceeds to step S911.

Step S909: When the printing type is "double-side printing," the previewer 208 transfers data indicative of "double-side printing" to the user interface driver 203, and acquires a list of options that can be set with respect to the paper type, i.e., the table 303.

Step S910: The previewer 208 extracts options that are commonly included from the list of options on the paper type that can be set when the printing type is "same-size printing" which is acquired in step S907 and the list of options on the paper type that can be set when the printing type is "double-side printing" which is acquired in step S909. Then, the previewer 208 displays the extracted options on the display device 104 (refer to FIG. 7), and ends the control.

Step S911: The previewer 208 displays on the display device 104 (refer to FIG. 5) the list of options on the paper type that can be set when the printing type is "same-size printing" which is acquired in step S907, and ends the control.

By the procedure shown in FIG. 9, options are displayed on the user interface screen. When a new setting value is selected from the options, the setting value of the target item is changed. The changed print setting value is stored by the previewer 208. This procedure is shown in FIG. 10A. First, the changed item is determined (S1001). In a case of a paper type, the changed setting value is stored (S1002) as a newly set value of the paper type for the current page (i.e., the page currently displayed on the preview area 420). In a case of a paper-feed method, the changed setting value is stored (S1003) as a newly set value of the paper-feed method for the current page (i.e., the page currently displayed on the preview area 420).

<Processing Upon Printing Start>

When the printing start button 405 in FIG. 4 is depressed after a change is made in the print setting in the foregoing procedure through the displayed user interface, the document being previewed is printed. FIG. 10B shows the printing start procedure of the previewer 208. The print setting that has been changed and stored is transferred to the printing processor 205 (S1011), and data indicative of a printing start designation is transferred to the printing processor 205 (S1012). In response, the printing processor 205 performs processing from numeral 1125 in FIG. 11, and prints the document being previewed utilizing the print setting that has been changed.

By virtue of the above-described configuration, the printing system according to the present embodiment enables a user to confirm a print result as well as print-setting contents set by an application program or the like when a print preview of print-target data such as a document is displayed prior to actually printing the print-target data on paper. Furthermore, in a case where a user realizes an error in a print setting during print preview displaying, the user can change the print setting without terminating the print processing, then execute printing. Moreover, since options that can be selected by a user with respect to each print setting are displayed in accordance with the current print-setting contents, it is possible to prevent a user from making an erroneous change in the print setting. Particularly in a case where setting of an item that allows changes is limited in accordance with a value of a setting item that does not allow changes, options selectable within the scope of limitation are provided to a user. Accordingly, erroneous setting can be prevented.

[First Modification]

Note that the above embodiment assumes that the print-setting items subjected to change upon preview displaying are a paper type and a paper-feed method. This is because these items are frequently changed in the step of print execution. However, the setting items subjected to change are not limited to the above. The setting items subjected to change upon preview displaying may include, for instance, a printing method (double-side printing/single-side printing), a paper size, a paper orientation, margins for binding, n-up printing designation, a scaling factor, watermark setting, header/footer setting, a paper-ejection method (stapling and so on), cover-page insertion, and index paper insertion/paper insertion. Note, in this case, when a value of one setting item is changed, options of other items are changed accordingly. Therefore, every time a pull-down menu of each item is selected, processing similar to FIG. 9 is performed to display options.

[Second Modification]

Although a setting value of the item "printing type" is determined by the previewer 208 in the above-described embodiment, the determination may be made by the user interface driver 203, and a list of selectable options according to the determination result may be returned to the previewer 208.

Second Embodiment

In the first embodiment, options of respective print settings are limited and displayed in accordance with print-setting contents of a page currently displayed on the print preview, so that a user can make a change in the print setting during print preview displaying within the scope of options that can be selected by the user with respect to each page. However, in general, in a case where print-target data having plural pages is generated by an application program, it is rare to change the print setting for each page. In most cases, the print-setting contents are the same in all pages of the print-target data. Therefore, when the print setting is changed during print preview displaying, it is preferable to change the print setting of all pages to the same contents all together. In view of this, the present embodiment is configured so as to enable a user to change print settings of all pages of print-target data all together during print preview displaying. Note, with respect to the parts in common with the first embodiment, for instance, FIGS. 1, 2, 3 and 11, descriptions thereof are omitted.

Figure 15:
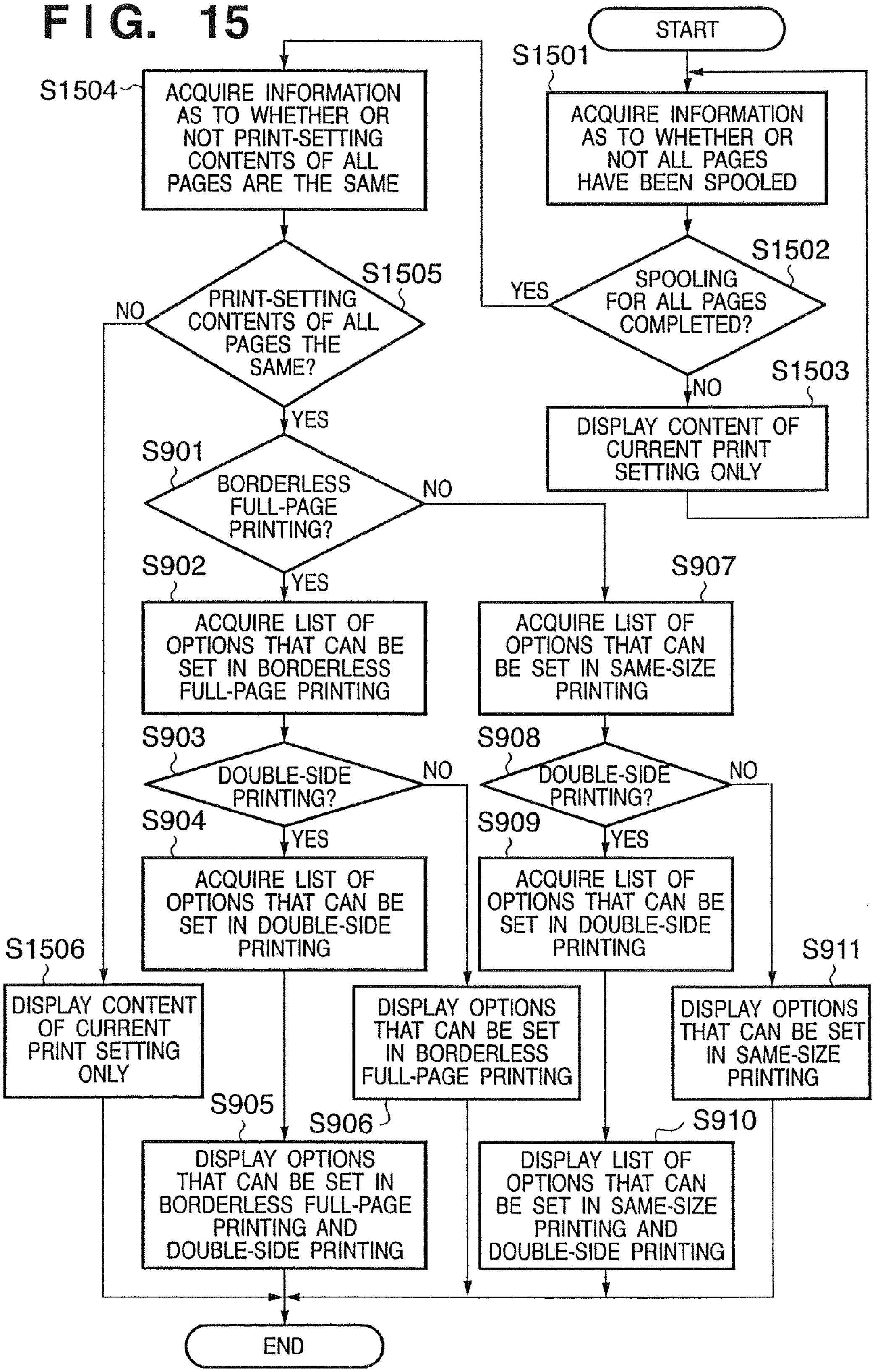
FIG. 15 is a flowchart describing an operation executed when a previewer according to the second embodiment of the present invention displays a list of selectable options upon print preview displaying.

Note that the processing in FIG. 9 is characteristic of the first embodiment. In the second embodiment, the processing in FIG. 15 is executed in place of the processing in FIG. 9. With respect to FIG. 11, the present embodiment differs from the first embodiment as in the difference between FIGS. 9 and 15.

Figure 12:
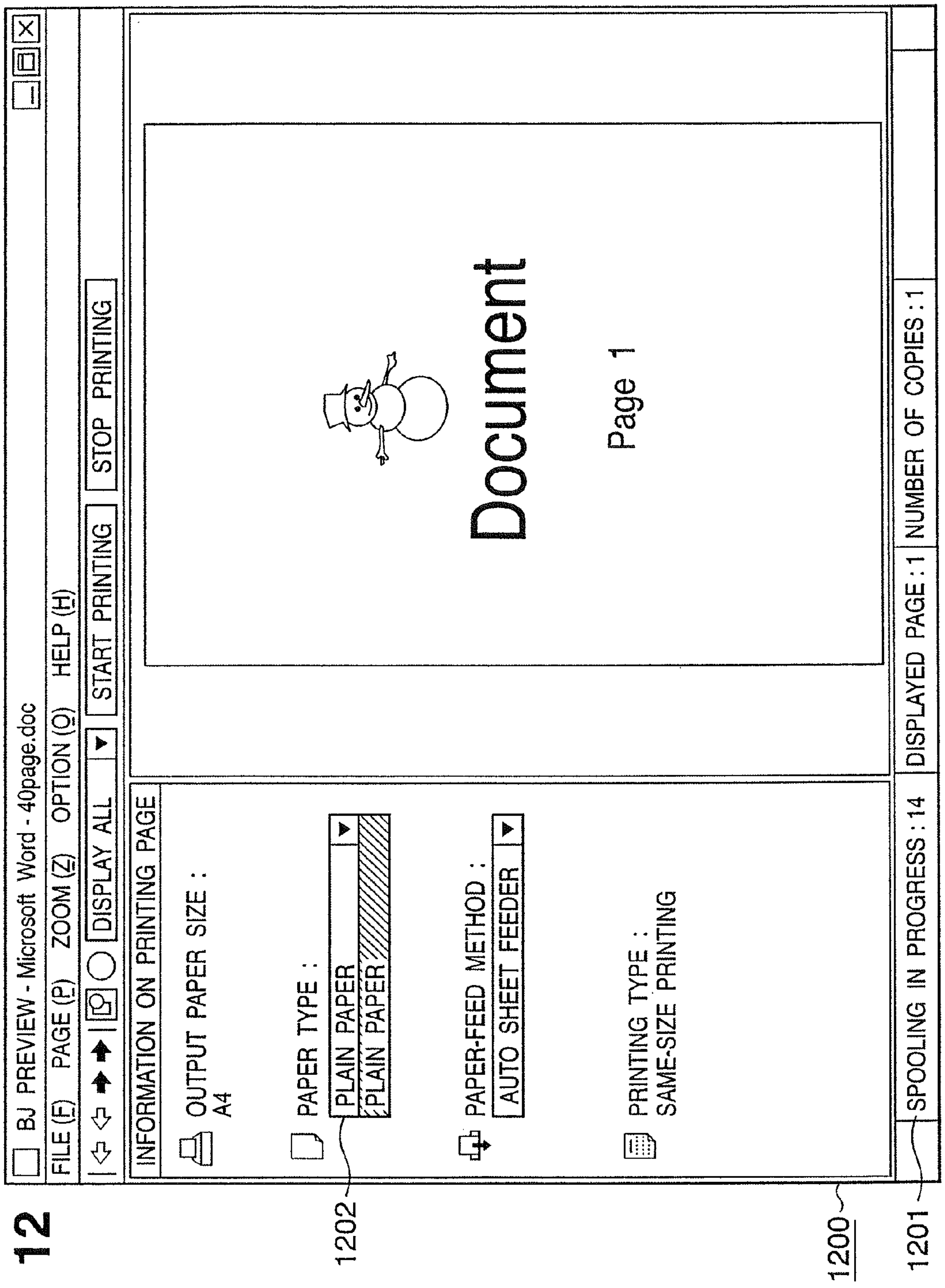
FIG. 12 is a view showing an example of a print preview screen displayed on the display device, in a state before spooling is completed for all pages of print-target data.

More specifically, in the printing system according to the present embodiment, when a preview screen shown in FIG. 12, in particular, a user interface that allows a user to change the print setting is displayed, the previewer 208 inquires the printing processor 205 about information on whether or not the print-setting contents are the same throughout the entire pages of the print-target data, in other words, whether or not at least the setting values of items that may be changed are common throughout the entire document data being previewed.

When the printing processor 205 receives an inquiry from the previewer 208 about the information on whether or not the setting values of items subjected to change are common throughout the entire document data being previewed, the printing processor 205 acquires print setting data of each page from the EMF spool file 204 to determine whether or not the print setting of all pages is the same, in a case where all the print-target data of the target document has already been stored in the EMF spool file 204 (spooling has been completed). Then, the printing processor 205 notifies the previewer 208 of the information indicative of whether or not the setting values of items subjected to change are common throughout the entire document data being previewed.

Based on the information notified by the printing processor 205, in a case where the setting values of items subjected to change are common throughout the entire document data being previewed, the previewer 208 acquires a list of options with respect to the items from the user interface driver 203 as similar to the first embodiment, displays the list of options of print setting items that can be selected by a user on the display device 104, and accepts changes on the print setting from the user.

In a case where the user makes a change in the print setting, the previewer 208 changes the print setting in all pages of the print-target data all together, and displays the print-setting contents on the display device 104.

<Print Preview Display Screen>

FIG. 12 shows an example of a screen 1200 of the print preview 211 displayed on the display device 104 by the previewer 208, in a state before spooling is completed for all pages of the print-target data. On the screen 1200 in FIG. 12, the display area 1201 indicates whether or not spooling has been completed for all pages of the print-target data. The display area 1201 shows an example in which spooling has not been completed for all pages of the print-target data. On the screen 1200 in FIG. 12, the o selection area 1202 shows a list of options that can be selected by a user with respect to a paper type, in a case where the printing type is "same-size printing."

When the spooling is in progress for all pages of the print-target data as shown in FIG. 12, the list of options that can be selected by a user shows a current setting value of the print setting, and a user cannot change the setting. The example in FIG. 12 shows that "plain paper" is set in the paper type with respect to the page being previewed, and other options are not displayed except for the current setting value; thus the setting value cannot be changed.

Figure 13:
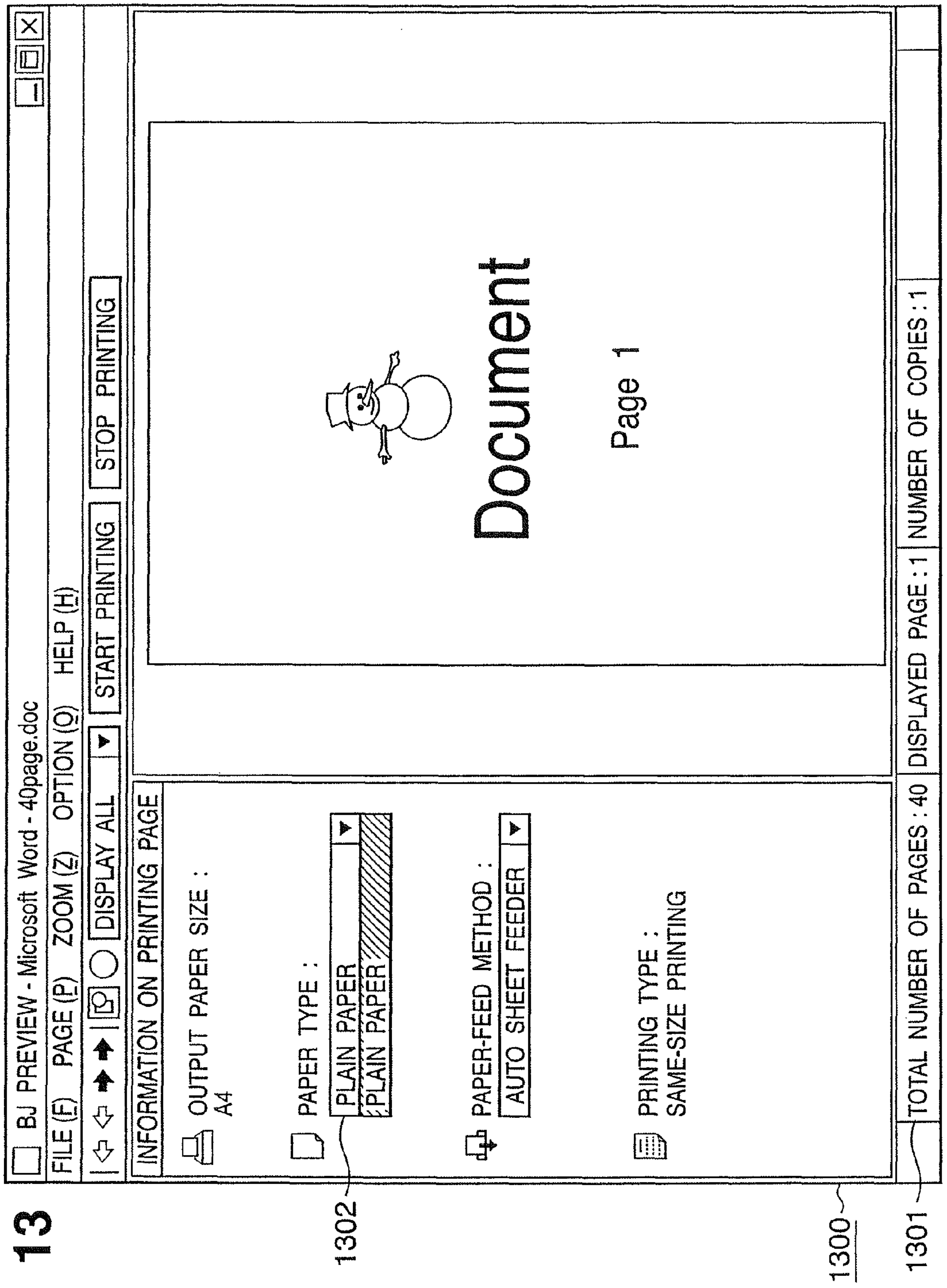
FIG. 13 is a view showing an example of a print preview screen displayed on the display device, in a state after spooling is completed for all pages of the print-target data and in a case where print-setting contents of all pages of the print-target data are not the same.

FIG. 13 shows an example of a screen 1300 of the print preview 211 displayed on the display device 104 by the previewer 208, in a state after spooling is completed for all pages of the print-target data and in a case where the print-setting contents of all pages of the print-target data are not the same. On the screen 1300 in FIG. 13, the display area 1301 indicates whether or not spooling has been completed for all pages of the print-target data. Showing the total number of pages in the display area 1301 indicates completion of spooling for all pages of the print-target data.

On the screen 1300 in FIG. 13, the selection area 1302 shows a list of options that can be selected by a user with respect to a paper type, in a case where the printing type is "same-size printing." Although the spooling is completed for all pages of the print-target data, if the print-setting contents are not common in all pages of the print-target data as shown in FIG. 13, the list of options that can be selected by a user with respect to a paper type shows only the current setting value of the paper type, and the user cannot change the setting of the paper type.

Figure 14:
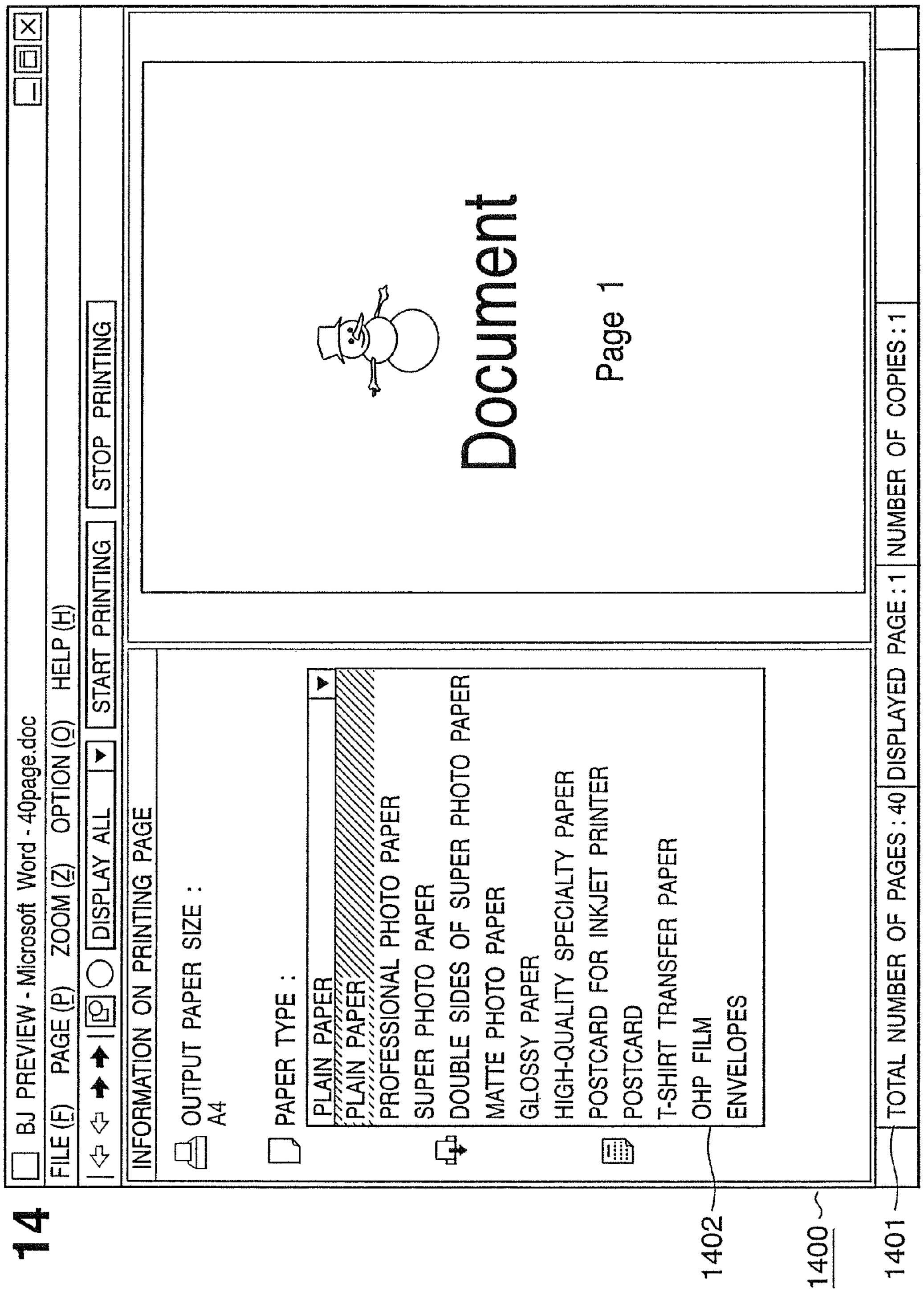
FIG. 14 is a view showing an example of a print preview screen displayed on the display device, in a state after spooling is completed for all pages of the print-target data and in a case where the print-setting contents of all pages of the print-target data are the same.

FIG. 14 shows an example of a screen 1400 of the print preview 211 displayed on the display device 104 by the previewer 208, in a state after spooling is completed for all pages of the print-target data and in a case where the print-setting contents of all pages of the print-target data are the same. On the screen 1400 in FIG. 14, the display area 1401 indicates whether or not spooling has been completed for all pages of the print-target data. Showing the total number of pages in the display area 1401 indicates completion of spooling for all pages of the print-target data.

On the screen 1400 in FIG. 14, the selection area 1402 shows a list of options that can be selected by a user with respect to a paper type, in a case where the printing type is "same-size printing." When the spooling is completed for all pages of the print-target data and the print-setting contents are common in all pages of the print-target data as shown in FIG. 14, the user is able to change the setting of the paper type.

<Operation of Printing System 100>

FIG. 15 is a flowchart describing an operation executed when the previewer 208 displays a list of options that can be selected by a user with respect to each print setting. In FIG. 15, with respect to the processing similar to that of the first embodiment shown in FIG. 9, the same step numbers are assigned and descriptions thereof are omitted. FIG. 15 focuses on the processing of determining a displaying method of the screen 1200 to 1400 shown in FIGS. 12 to 14 performed by the previewer 208. The processing in FIG. 15 is executed, for instance, when a user selects a pull-down menu of the selection area 1202 on the screen shown in FIG. 12. Note, instead of reading the option list information table each time the list of options is displayed, the table may be read prior to displaying the list of options and may be utilized upon displaying.

Step S1501: The previewer 208 acquires information from the printing processor 205 on whether or not spooling has been completed for all pages of the print-target data.

Step S1502: By referring to the information on whether or not spooling has been completed for all pages of the print-target data which has been acquired in step S1501, the previewer 208 makes determination on whether or not spooling is completed for all pages of the print-target data. As a result of the determination, if spooling is completed for all pages of the print-target data, the control proceeds to step S1504; otherwise, the control proceeds to step S1503.

Step S1503: The previewer 208 displays on the display device 104 only the paper type being set in the current print setting as, a list of options that can be set with respect to a paper type, then the control returns to step S1501.

Step S1504: The previewer 208 acquires from the printing processor 205 information on whether or not the print-setting contents of all pages of the print-target data are the same.

Step S1505: By referring to the information on whether or not the print-setting contents of all pages of the print-target data are the same which has been acquired in step S1504, the previewer 208 makes determination on whether or not the print-setting contents of all pages of the print-target data are the same. As a result of the determination, if the print-setting contents of all pages of the print-target data are the same, the control proceeds to step S901; otherwise, the control proceeds to step S1506.

Step S1506: The previewer 208 displays on the display device 104 only the paper type being set in the current print setting as a list of options that can be set with respect to a paper type, and ends the control.

As described above, the processing shown in FIG. 15 includes, in addition to the processing in FIG. 9, determination on whether or not spooling has been completed for the data being previewed and whether or not the values of the print setting are common in all pages. In a case where spooling has not been completed or a case where the values of the print setting are not common throughout the entire document, changes in the print setting are not allowed. Otherwise, changes in the print setting are allowed as similar to FIG. 9. When "printing start" is designated, the previewer 208 transfers the changed print setting to the printing processor 205 as the print setting of the entire pages. As a result, the changes in the print setting are reflected on all pages and printing is performed.

As described above, according to the present embodiment, instead of changing a print setting with respect to each page of a document, changing the print setting of one page can change the setting of the entire document. Accordingly, the operability of the printing system is improved.

Third Embodiment

The first and second embodiments are configured in a way that options of respective print settings are displayed with limitation in accordance with current print-setting contents, so that a user can change the print setting during print preview displaying within the scope of options that can be selected by the user. However, in a case where there are plural print-setting items whose setting values are subjected to change during print preview displaying, a change made in one print setting item by a user may result in inconsistency between the changed print-setting item and other print-setting, items set so far, thus the print settings may become invalid. Therefore, even when such inconsistency occurs among values of setting items, it is preferable if the user is easily led to a desired print setting. Note in the present embodiment, with respect to the parts in common with the first embodiment, descriptions thereof are omitted.

In view of the above, the present embodiment is configured so that, in a case where a change made in a first print setting during print preview displaying invalidates a second print setting set so far, the invalidation is notified to the user, and the second print setting is automatically corrected (changed) to a most appropriate setting.

More specifically, when the previewer 208 receives a change in print setting from a user during print preview displaying, the previewer 208 refers to a print-setting priority rank data table internally stored in advance and acquires setting values of a print setting item having a lower priority rank (hereinafter referred to as a subordinate item) than the print setting item changed by the user (hereinafter referred to as a priority item). Note that, when a setting value of one item is changed, if there is no corresponding subordinate item, the item is not a priority item. Next, the previewer 208 acquires from the user interface driver 203 a list of options of the subordinate item, corresponding to the priority item. If the current setting value of the subordinate item is not included in the acquired list of options, the previewer 208 inquires the user interface driver 203 of the most appropriate setting (hereinafter referred to as "most appropriate setting data") of the subordinate item corresponding to the setting value of the priority item that has been changed.

When the user interface driver 203 receives the inquiry about the most appropriate setting data from the previewer 208, the user interface driver 203 refers to a most appropriate setting data table internally stored in advance, and notifies the previewer 208 of the most appropriate setting data of the subordinate item.

The previewer 208 displays on the display device 104, for instance, the name of the subordinate item whose setting value is invalidated due to the change in the setting value of the priority item, and changes the setting value of the subordinate item to the most appropriate setting in accordance with the most appropriate setting data notified by the user interface driver 203.

FIG. 16 shows an example of a print-setting priority rank data table stored in the previewer 208. In FIG. 16, numeral 1601 indicates a priority rank of each print setting item, and numeral 1602 indicates a print setting item having a priority rank 1601. In FIG. 16, the item "paper type" has priority rank 1, and the item "paper-feed method" has priority rank 2. Therefore, the paper-feed method has a lower priority rank than the paper type. In other words, when the "paper type" is changed on a preview screen, the paper type becomes a priority item and the paper-feed method becomes a subordinate item according to the table in FIG. 16.

Figure 17:
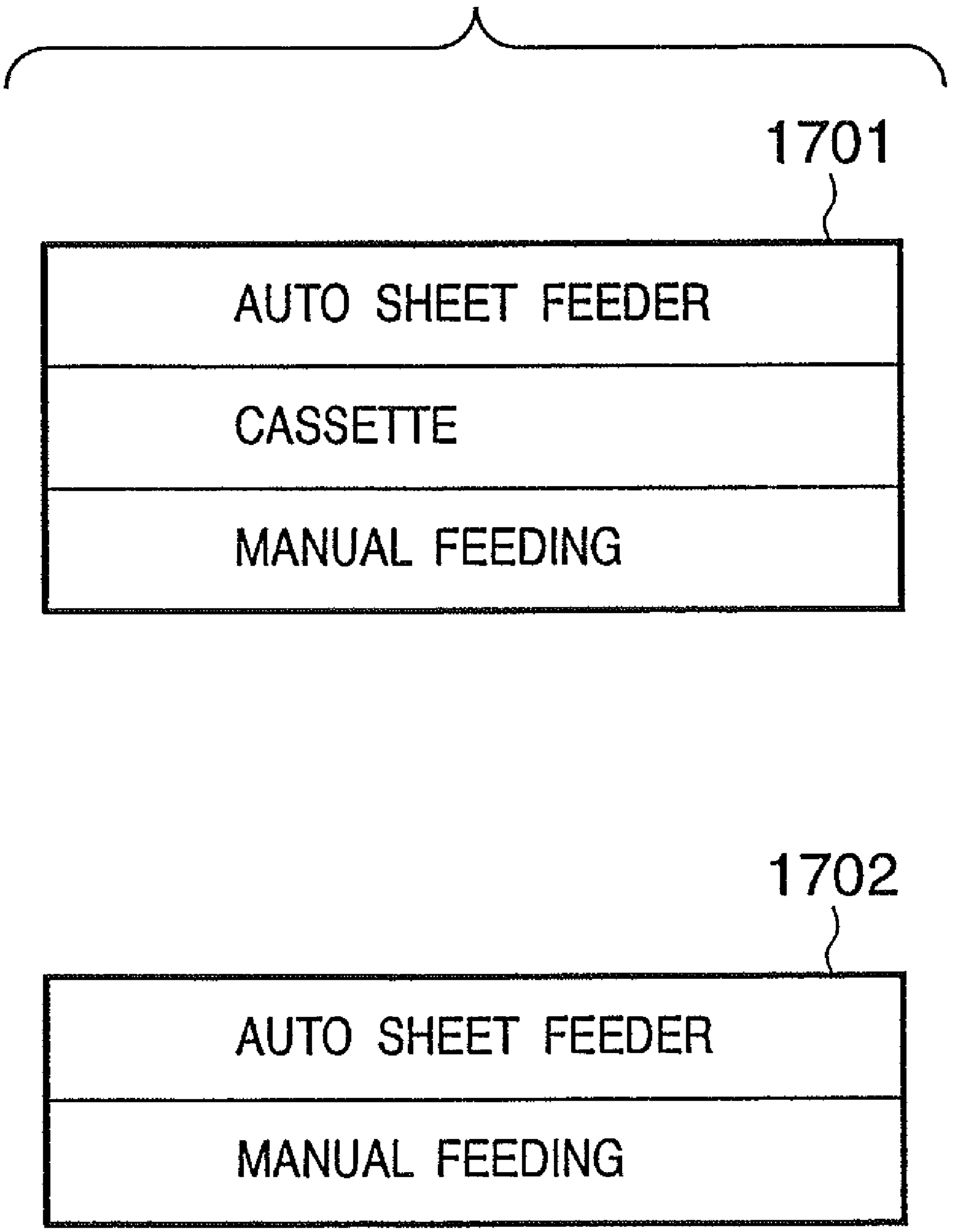
FIG. 17 is a view showing an example of an option list information table with respect to paper-feed methods.

FIG. 17 shows an example of an option list information table with respect to paper-feed methods among the option list information tables stored in the user interface driver 203. The table 1701 shows a list of options that can be set with respect to a paper-feed method in a case where the paper type is "plain paper." The table 1702 shows a list of options that can be set with respect to a paper-feed method in a case where the paper type is "professional photo paper." In any of these tables, options are stored in association with values of corresponding paper types.

FIG. 18 shows an example of the most appropriate setting data table in the subordinate item "paper-feed method" corresponding to the priority item "paper type" among the most appropriate setting data table stored in the user interface driver 203. In FIG. 18, numeral 1801 indicates a print setting item having a higher priority rank than the paper-feed method, which is the condition for determining the most appropriate setting of the paper feed method. Although the priority item is fixed to the "paper type" in FIG. 18, the table may be configured more flexibly by providing the table with an identifier area corresponding to a priority item and giving a setting value to each of the identifier. Numeral 1802 indicates the most appropriate value of the paper-feed method corresponding to a case where the "paper type" having a higher priority rank than the "paper-feed method" has a value set in the area 1801. Although the subordinate item is fixed to the "paper-feed method" in FIG. 18, the table may be configured more flexibly by providing the table with an identifier area corresponding to a priority item. Note that, in FIG. 18, the priority item is fixed to the "paper type" and the subordinate item is fixed to the "paper-feed method," and that for the setting value "plain paper" of the priority item, the most appropriate value of the subordinate item is "cassette," and for the setting value "professional photo paper," the most appropriate value is "auto sheet feeder."

<Print Preview Display Screen>

Figure 19:
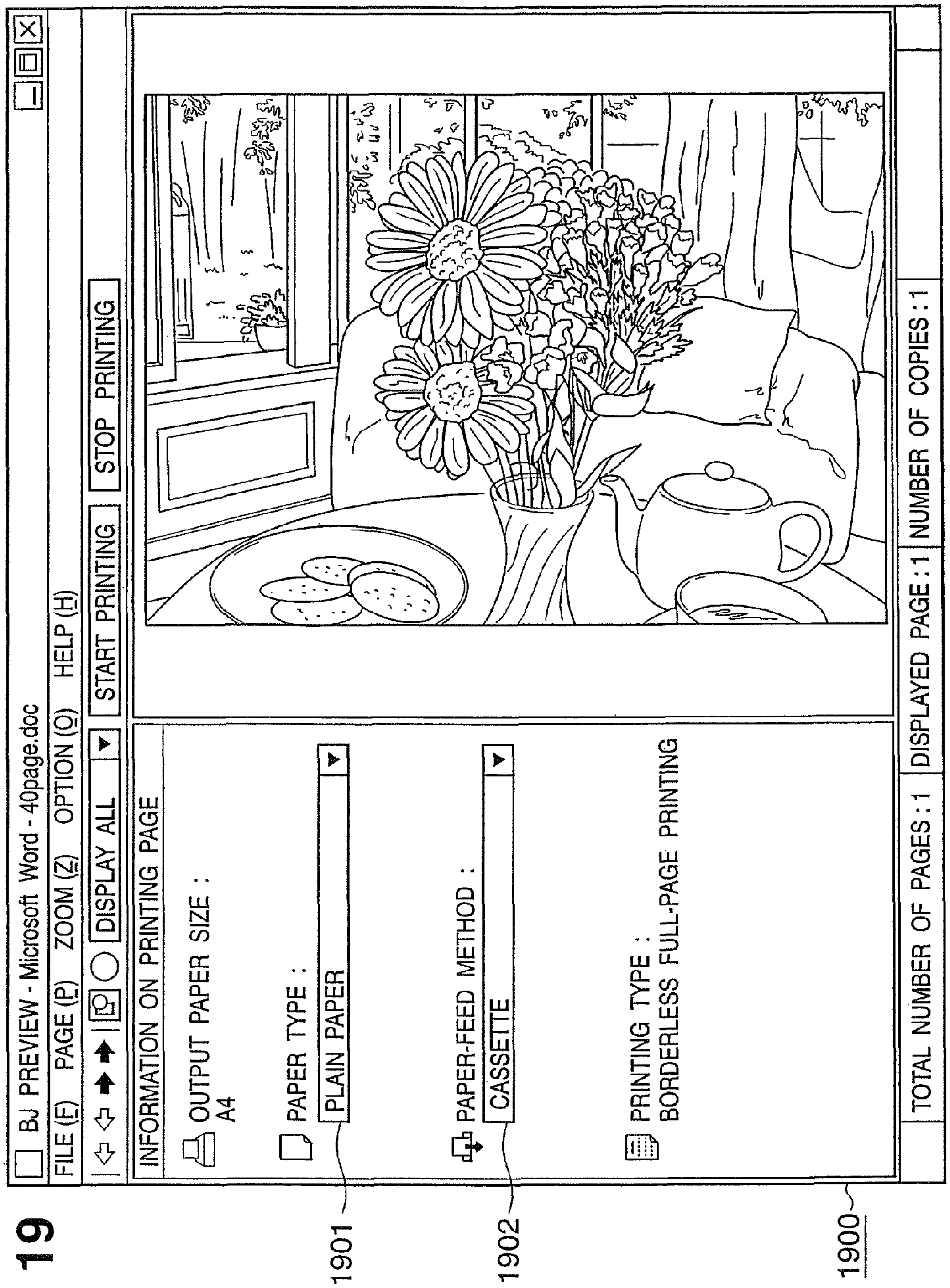
FIG. 19 is a view showing an example of a print preview screen in a case where a paper type is set in "plain paper"
Figure 20:
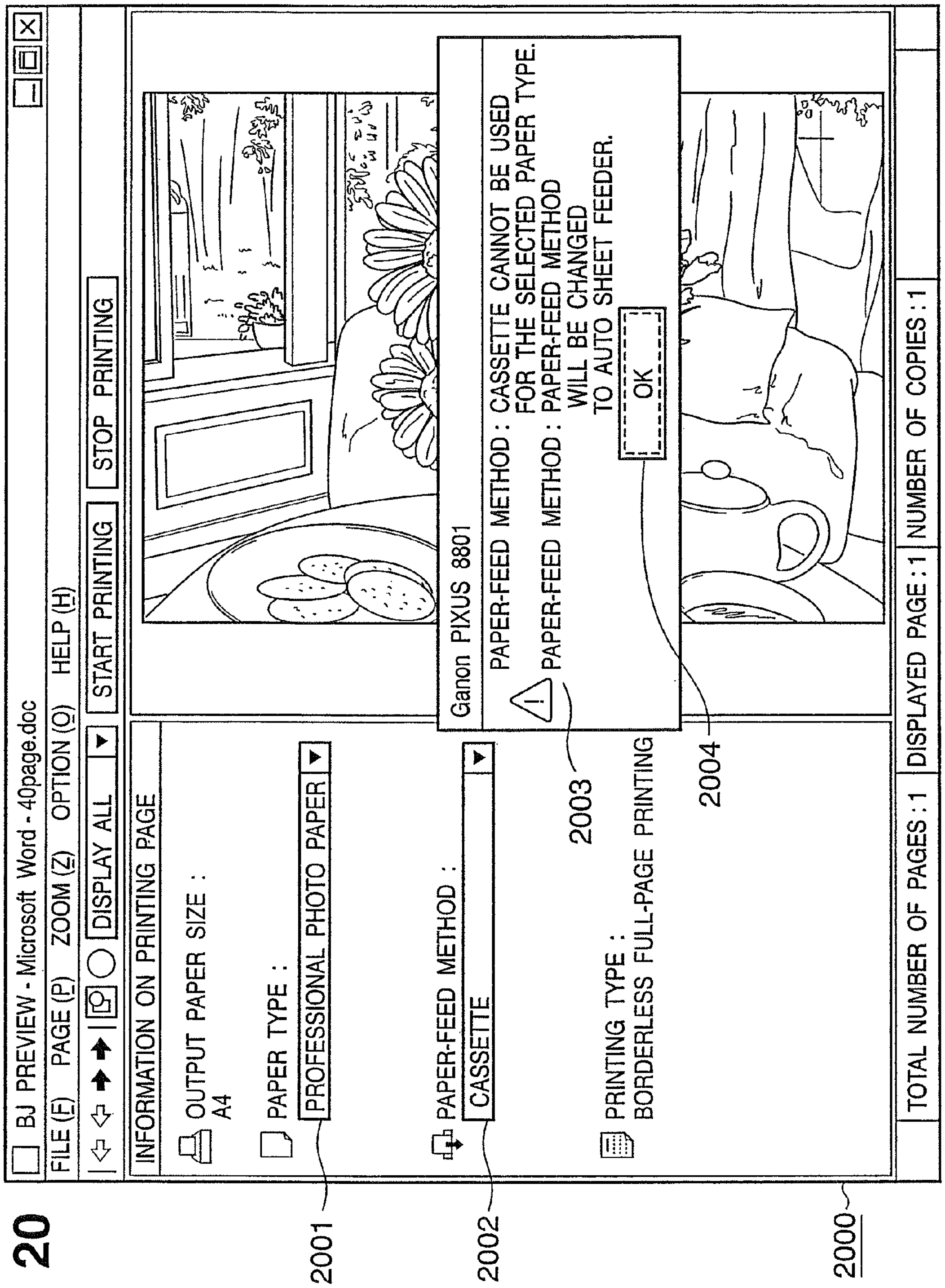
FIG. 20 is a view showing an example of a print preview screen immediately after a paper type is changed to "professional photo paper"
Figure 21:
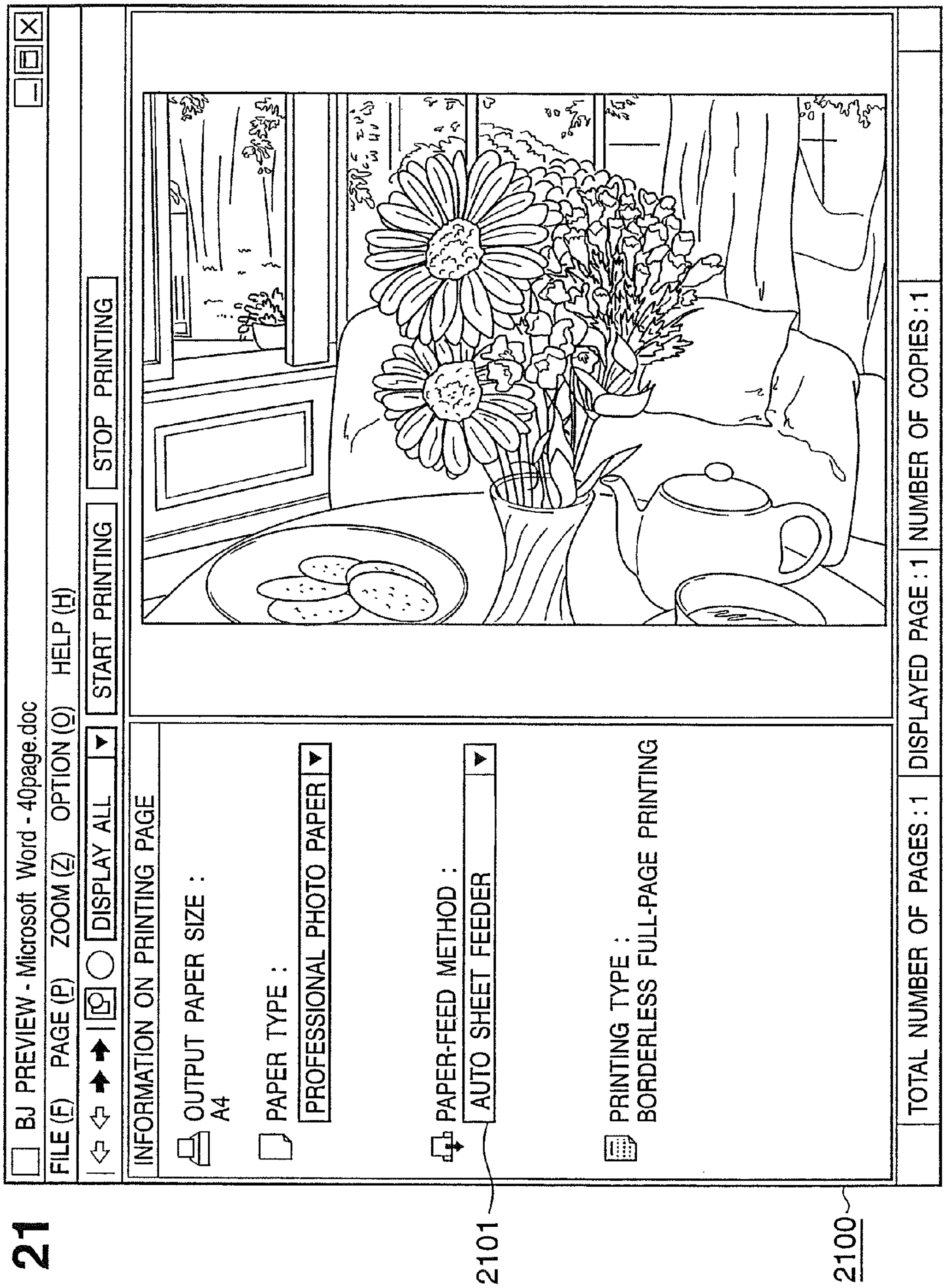
FIG. 21 is a view showing an example of a print preview screen displayed after the previewer automatically corrects the setting of the paper-feed method.

FIGS. 19 to 21 show examples of screens 1900 to 2100 of the print preview 211 displayed on the display device 104, in a case where the paper type is changed from "plain paper" to "professional photo paper" on the print preview 211 displayed on, the display device 104 by the previewer 208.

FIG. 19 shows an example of the screen 1900 of the print preview 211 in a case where the paper type is set in "plain paper." On the screen 1900 in FIG. 19, the first selection area 1901 indicates a paper type to be employed when the page currently displayed on the print preview is printed. The second selection area 1902 indicates a paper-feed method to be adopted when the page currently displayed on the print preview is printed. Note in FIGS. 19 to 21, the first display area is provided for changing the setting of the priority item, and the second display area is provided for changing the setting of the subordinate item.

FIG. 20 shows an example of the screen 2000 of the print preview 211 immediately after the user changes the paper type from "plain paper" shown in FIG. 19 to "professional photo paper" in the first selection area 1901. Note that changing the setting value of the first selection area is performed in the similar procedure and similar processing to that of the first embodiment. The first selection area 2001 shows a paper type setting value which has been changed by the user. The second selection area 2002 shows a paper-feed method that has been set until the user changes the paper type setting. In FIG. 20, "cassette" is set as similar to the second selection area 1902.

A warning indication 2003 is a notification screen displayed on the display device 104 by the previewer 208. The notification screen notifies a user of the fact that the change made by the user in the paper type setting in the first selection area 2001 has caused inconsistency in the setting value of the paper-feed method in the second selection area 2002, and that the current setting value of the paper-feed method is invalidated. In this example, since the paper type is set in "professional photo paper," the most appropriate setting value of the corresponding paper-feed method is "auto sheet feeder" as shown in FIG. 18. The warning indication 2003 is displayed accordingly. The OK button 2004 is provided for closing the notification screen showing the warning indication 2003 and proceeding the processing of the previewer 208. When the user depresses the button 2004, the warning indication 2003 is deleted, and preview processing (print processing) continues.

FIG. 21 shows an example of a screen 2100 of the print preview 211 displayed after the user depresses the button 2004 on the screen 2000 in FIG. 20 and the setting of the paper-feed method is automatically corrected by the previewer 208. On the screen 2100, the second selection area 2101 shows the setting value (auto sheet feeder) of the paper-feed method automatically changed by the previewer 208 in response to the change made by the user in the paper type setting (professional photo paper) in the first selection area 2001 in FIG. 20.

<Operation of Printing System 100>

Figure 22:
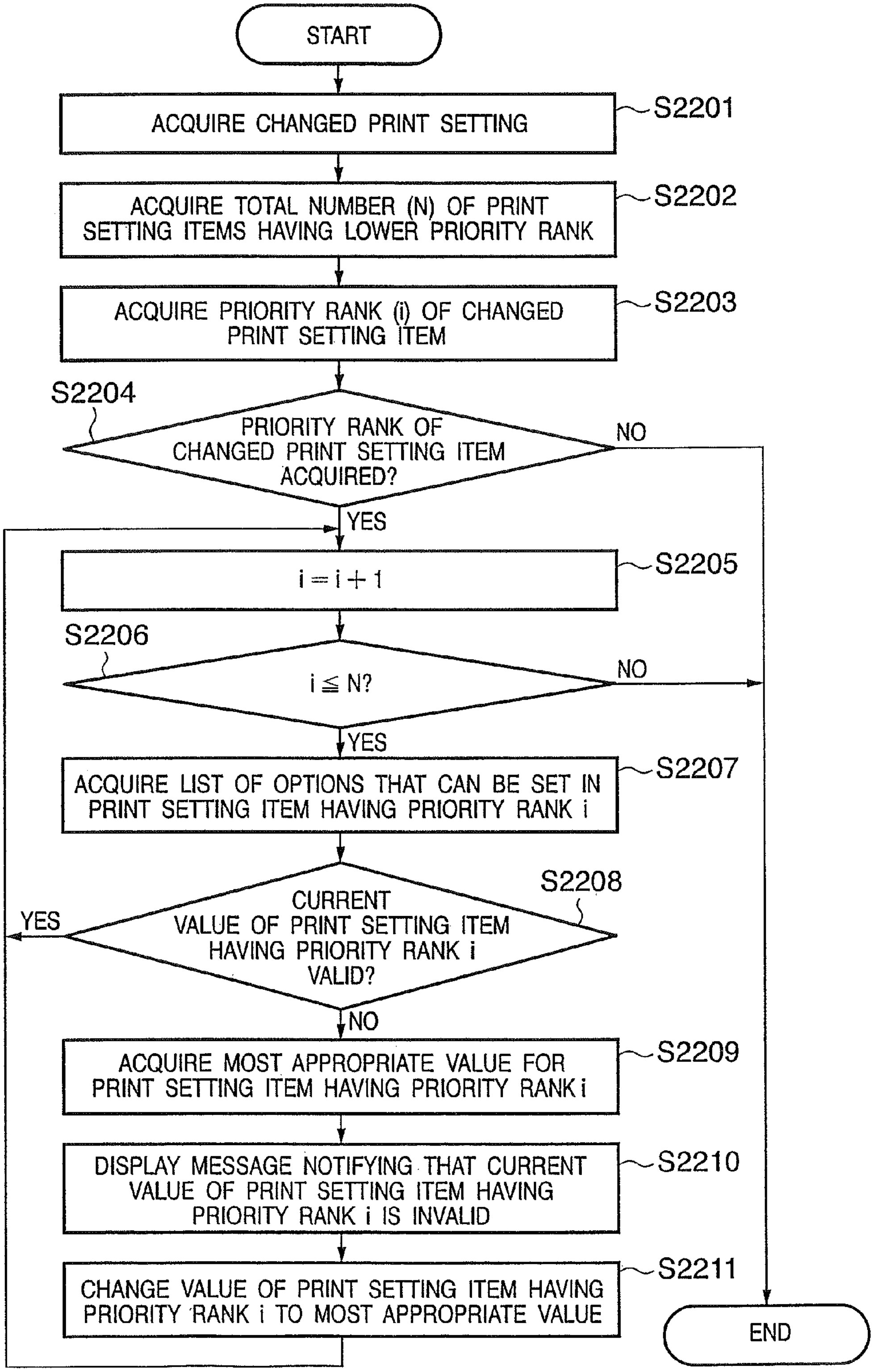
FIG. 22 is a flowchart describing an operation executed when a previewer according to the third embodiment of the present invention corrects a print setting having a low priority rank to the most appropriate value upon print preview displaying.

FIG. 22 is a flowchart describing an operation executed when a user makes changes in a print setting item (priority item) and the previewer 208 changes a value of a subordinate print setting item having a lower priority rank to the most appropriate value. This procedure, corresponding to numerals 1120 to 1122 in FIG. 11, is executed by the previewer 208.

Step S2201: The previewer 208 acquires a print setting changed by a user. An identifier of the changed setting item and a setting value after the change are acquired.

Step S2202: The previewer 208 acquires the total number (N) of print setting items having a lower priority rank by referring to the print-setting priority rank data table shown in FIG. 16.

Step S2203: In steps S2205 to S2211, processing is repeated for the number of times corresponding to the number of print setting items having a lower priority rank than that of the print setting changed by the user (i.e., the number of subordinate items corresponding to the priority item changed by the user), thereby changing the print setting to the most appropriate setting value. For this reason, in step S2203, a processing counter value i is initialized to the priority rank of the print setting changed by the user.

Step S2204: It is determined whether or not the priority rank of the print setting changed by the user is acquired in step S2203. If NO, the control ends; otherwise, the control proceeds to step S2205.

Step S2205: The processing counter value i is incremented by 1 by the previewer 208.

Step S2206: The previewer 208 determines whether or not the processing counter value i has exceeded the total number of print setting items having a lower priority rank, which has been acquired in step S2202. As a result of the determination, if the counter value i has exceeded the total number of print setting items having a lower priority rank, the control ends; otherwise, the control proceeds to step S2207.

Step S2207: The previewer 208 acquires from the user interface driver 203 a list of options that can be set in the print setting item having the same priority rank as the processing counter value i. For instance, the previewer 208 transfers a value of the "paper type" setting that has been changed by a user to the user interface driver 203 and requests an option list information table. In response, an option list information table corresponding to the setting value of the paper type is returned to the previewer 208.

Step S2208: The previewer 208 determines whether or not the current setting value of the print setting item having the same priority rank as the processing counter value i is valid (whether or not there is consistency between the setting value of the priority item and the setting value of the subordinate item). The determination is made based on whether or not the current setting value of the subordinate item having the same priority rank as the processing counter value i is included in the option list information table acquired in step S2207. If the value is included, it is valid, but if the value is not included, it is invalid.

As a result of the determination, if it is determined that the current setting value of the subordinate item having the same priority rank as the processing counter value i is valid, the control returns to step S2205; otherwise, the control proceeds to step S2209.

Step S2209: The previewer 208 acquires from the user interface driver 203 the most appropriate setting value of the subordinate item having the same priority rank as the processing counter value i. For this, the previewer 208 transfers the value of the priority item to the user interface driver 203 and requests the most appropriate setting value of the corresponding subordinate item. In response, the user interface driver 203 refers to the most appropriate setting data table shown in FIG. 18, and returns to the previewer 208 the most appropriate value of the subordinate item corresponding to the value of the priority item.

Note in the present embodiment, the priority item includes paper types only, and the corresponding subordinate item includes paper-feed methods only. Therefore, the user interface driver 203 can perform processing by hard-coding the priority item and the subordinate item respectively as the paper type and the paper-feed method. However, when there are plural numbers of priority items and each priority item has plural subordinate items, it needs to be handled more flexibly. In this case, for instance, the previewer 208 transfers the value of the item as well as the identifier of the item when requesting the list of options or the most appropriate data to the user interface driver 203. The user interface driver 203 stores setting values of the option list information table and the most appropriate setting data table in association with identifiers of the print-setting items.

Step S2210: The previewer 208 displays on the display device 104 a message notifying that the current setting value of the subordinate item having the same priority rank as the processing counter value i is invalid.

Step S2211: The previewer 208 changes the value of the subordinate item having the same priority rank as the processing counter value i to the most appropriate setting value acquired in step S2209.

According to the above-described procedure of the present embodiment, in a case where a user makes a change in a value of a print setting item during print preview displaying, values of other items that should be altered according to the changed item can be changed to the most appropriate values, and the change can be notified to the user. As a matter of course, the priority item and subordinate items are not limited to those described above in the foregoing embodiment as an example, but may be of other items.

[First Modification]

Note that the third embodiment can be implemented in combination with the first or the second embodiment. In particular, in a case where the third embodiment is combined with the second embodiment, there are two methods. In the first method, when a setting value of a subordinate item is changed, the change is allowed even if the value is not common throughout the entire document data. In the second method, prior to changing a setting of a priority item, determination is made as to whether or not the setting value is common throughout the entire document data with respect to the priority item and the subordinate item, and if there is one item that is not common throughout the entire document data, the change in the priority item is not allowed (is limited).

[Other Modification]

Note that the present invention is not limited to the present embodiment and various modifications can be made. For instance, in the above embodiments, in accordance with the content of one or plural print settings, options of other print settings are limited to user-selectable options only. However, the limitation method is not limited to this.

Furthermore, in the present embodiment, although the list of options that can be set with respect to each print setting condition is decided from the option list information table shown in FIG. 3 or FIG. 17, the decision method is not limited to this.

Furthermore, although the first embodiment enables to change, in page unit, print setting of printing data during print preview displaying and the second embodiment enables to change, all together, print setting of all pages of printing data during print preview displaying, it is also possible to configure the printing system so as to enable selection of either changing the print setting for each page or changing the print setting of all pages all together.

Furthermore, as described in the third embodiment, in a case where a change in one print setting item made by a user causes invalidation in the current setting value of another print setting item having a lower priority rank than the changed print setting item, the item being invalidated and the content of correction to the most appropriate setting value are displayed on the display device. However, the displaying method and displaying contents are not limited to this.

Moreover, as described in the third embodiment, in a case where a change in one print setting item made by a user causes invalidation in the current setting values of other plural print setting items having a lower priority rank than the changed print setting item, the item being invalidated and the content of correction to the most appropriate setting values are displayed on the display device for each of the plural print setting items to be invalidated. However, the item being invalidated and contents of correction to the most appropriate setting values may be displayed on the display device all at once with respect to the plural print setting items to be invalidated.

As has been set forth above, according to the above-described first to third embodiments, when a print preview of printing data such as a document is displayed prior to actually printing the data on a piece of paper, it is possible to confirm, together with the print result, contents of the print setting set by a user using an application program or the like.

Even if a user realizes an error in the print setting during print preview displaying, the user can change the print setting and execute printing without terminating the print processing. Furthermore, in accordance with the current print-setting contents, only the options that can be selected by a user with respect to each print setting are displayed. Therefore, erroneous changes in print settings can be prevented.

As described above, the above embodiments enable easy confirmation of print setting contents set by an application program during print preview displaying. Moreover, in a case where a user realizes an error in the print setting or wishes to change the print setting during print preview displaying, the above embodiments can easily lead the user to a desired print setting during print preview displaying. Therefore, a more user-friendly print preview function can be provided.

Fourth Embodiment

By virtue of the printing system according to the first to third embodiments, it is possible to confirm and change part of a print setting in the print preview displaying stage. However, in a case that processing according to the print setting is performed internally by the application program or the operating system (OS) and the printing data is stored in the EMF spool file 204, the processing according to the print setting has already been applied to the spooled data. In such case, even if a change in the print setting is allowed in the print preview stage according to the procedure described in the first to third embodiments, the changed print setting cannot be reflected on the printout. Because a discrepancy arises between the print setting and the actual state of the printer, the printing quality may decline.

For instance, there is a case that an application program performs color processing according to the "paper type" which is one of the print setting item. Referring to FIG. 2, the printing data spooled in the EMF spool file 204 has already been subjected to color processing. In this case, even if the paper type setting is changed in the print preview stage, color processing appropriate for the changed paper type cannot be performed. Therefore, intended colors do not appear on the selected paper, deteriorating the printing quality. More specifically, assume a case of printing image data with dye ink on plain paper and a case of printing the same image data with the same ink on coated paper provided for an inkjet printer. Even if the same color processing is performed on the same image for respective paper, the colors that come out on the respective paper are sometimes visually different due to different ink permeability and the like. Furthermore, assuming a case of white paper, color paper, and an OHP sheet, colors that come out on respective paper are different even if the same image is formed.

According to the printing system of the present embodiment, in a case where printing data generated by an application program is displayed on a print preview screen for allowing a user to change the print setting, if the processing related to the print setting that is about to be changed by the user has already been performed by the application program (or OS) with respect to the spooled printing data, with respect to each print setting item the system limits selections other than the options using the same parameter as the parameter of the already-performed processing, thereby preventing print quality deterioration upon the change in the print setting. More specifically, in the present embodiment, the print setting item to be limited is the "paper type," the processing related to the print setting is color processing, and the processing parameter is a color profile. Note in the present embodiment, since the main configuration of the printing system shown in FIGS. 1, 2, 4 and 11 is in common with the first to third embodiments, descriptions thereof are omitted. However, part of the user interface and configurations shown in FIG. 11 are characteristic to the present embodiment. The characteristic portions and different portions are described hereinafter.

The user interface screen displaying a print preview is shown in FIG. 4. The paper type 402 indicates paper types that can be selected from the current setting values. There are cases that color processing such as color matching is performed inside the application program 201 or the GM 205. Color matching is to absorb differences in visual colors, generated by differences in coloring characteristics of a medium on which an image is outputted (in this embodiment, paper type). A parameter of color matching processing is called a color profile, which includes a non-linear conversion table for respective color components. Color matching processing is performed using a color profile according to the paper type. If the paper type is changed after the color matching is performed, in other words, if the employed color profile is different before and after the change in the print setting, colors are not outputted normally.

FIG. 23 is a correspondence table 2301 of the paper type setting values and corresponding color profiles. The color profile used in "plain paper" setting is Profile_A.icm. Therefore, after color matching is performed, if the paper type is changed from "plain paper" to "postcard" or "envelope" that utilizes the same Profile_A.icm., colors are outputted normally. However, if the paper type is changed to "program photo paper" or "high-quality specialty paper" that utilizes Profile_B.icm or Profile_C.icm, the image printed on the selected type of paper will not have normal colors (intended colors), and the printing quality deteriorates. In view of this, it is determined whether or not color matching has been performed. When it is determined that color matching has been performed, the paper types provided to the user as selectable options are limited to the one that utilizes the same color profile as the one utilized in the color matching processing.

Figure 27:
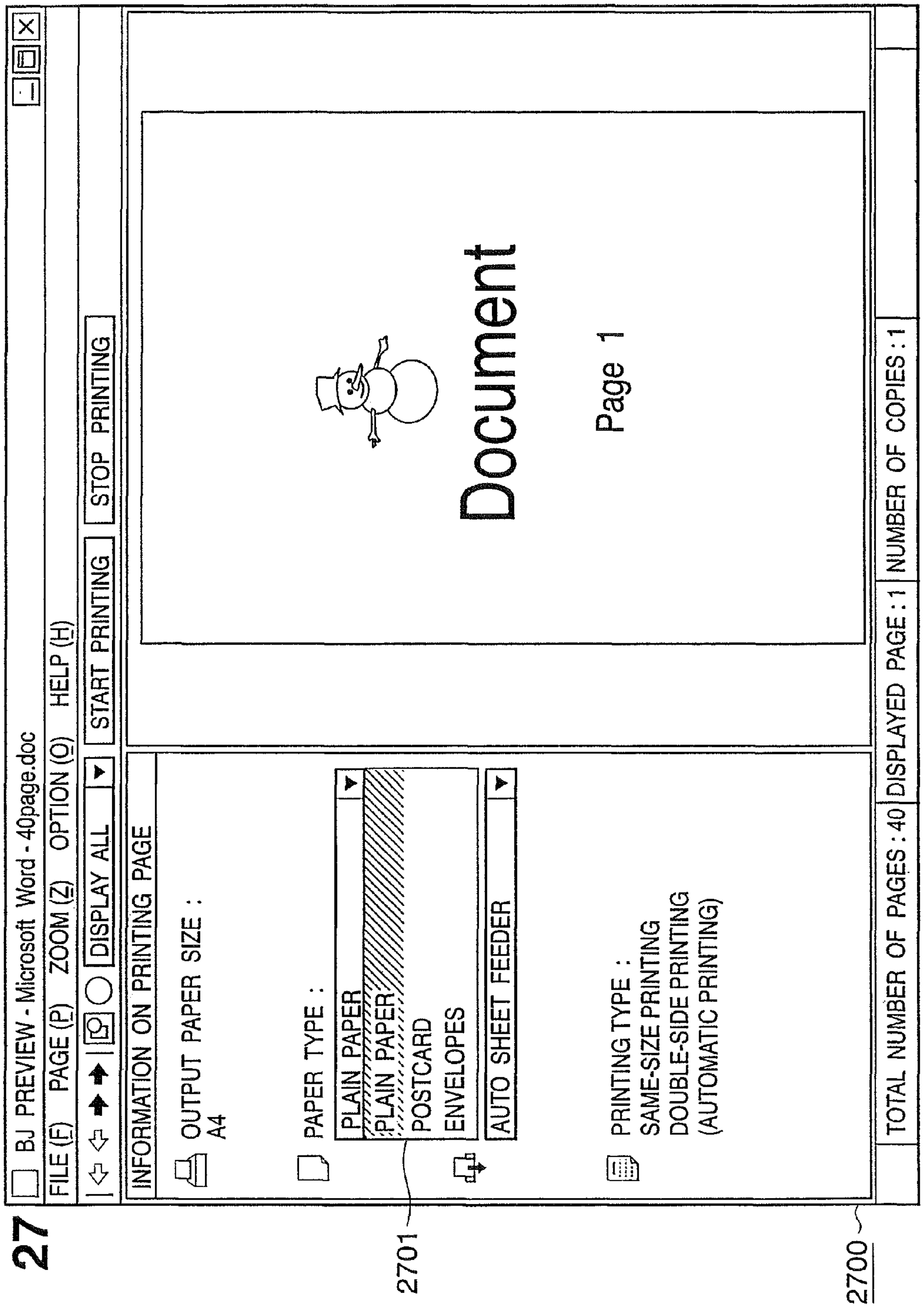
FIG. 27 is a view showing an example of a print preview screen displayed on the display device, in a case where a printing type is set in "same-size printing."

FIG. 5 shows an example of the print preview screen 500 in which all paper types are selectable. FIG. 27 shows an example of a print preview screen 2700 in which only the paper types that utilize the same color profile as the one utilized in the color matching are selectable. Although this example allows selection of all paper types that utilize the same color profile, changes in paper types may all be prohibited. This also achieves an effect of preventing print quality deterioration.

<Operation of Printing System 100>

Described below is a procedure of determining whether the previewer 208 displays the display screen 500 shown in FIG. 5 or the display screen 2700 shown in FIG. 27. For this, contents of option list information to be transferred to the previewer 208 are determined. In a case where color processing such as color management is performed by the application program 201, even if the paper type is changed, the color processing cannot be performed again by the application program after a preview is displayed. Therefore, paper type limitation is necessary. However, in the configuration shown in FIG. 2, in a case where color processing is performed by the GDT 202 in the OS, since data is outputted to the printer 207 through the GDI 202 again after preview displaying, color processing can be performed again at this stage by the GDT (in printing page data transmission 1127 in FIG. 11, data is transmitted through the GDT). Therefore, if color processing is performed by the OS, paper type limitation is not necessary.

Figure 11:
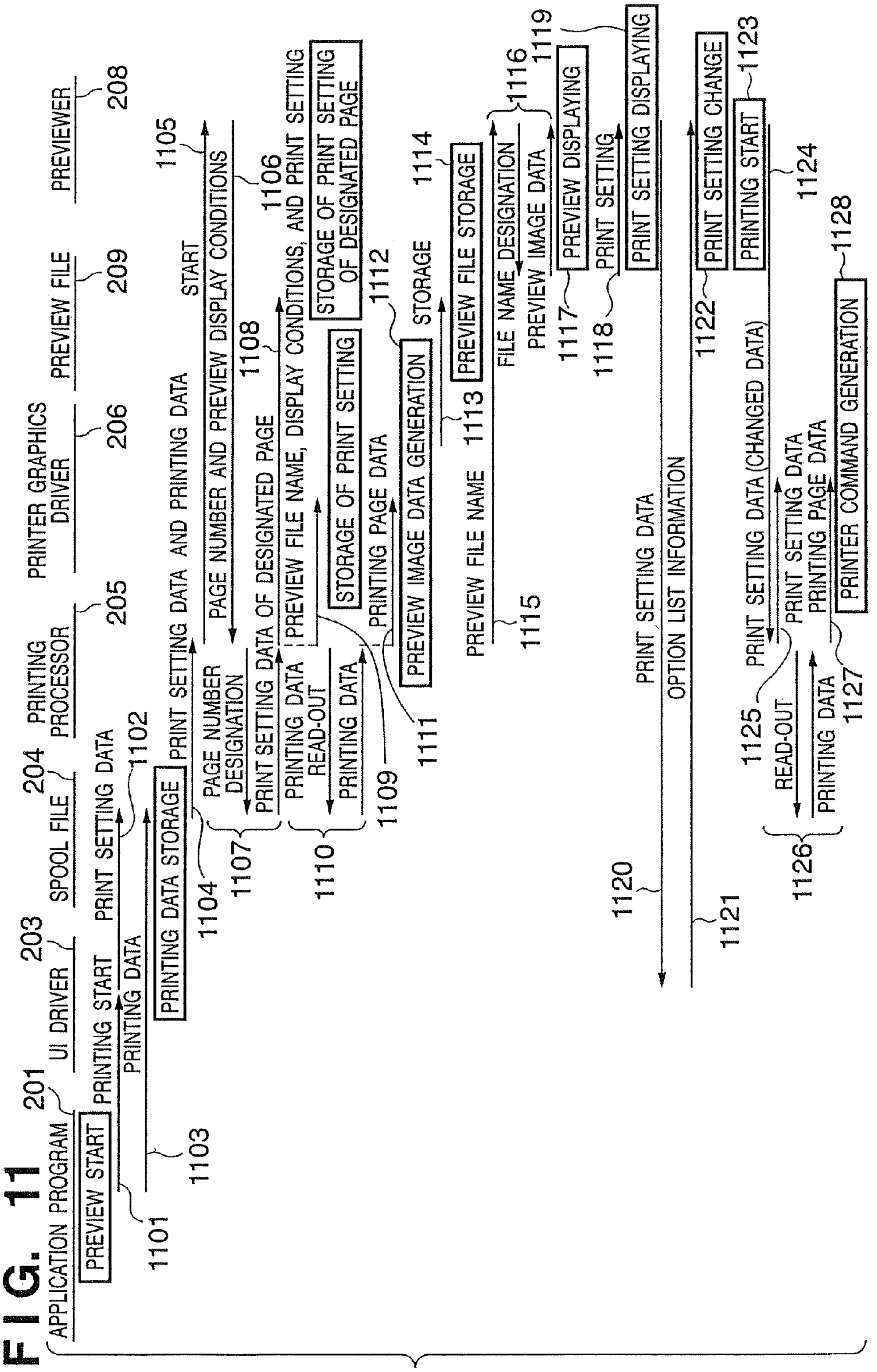
FIG. 11 is a diagram showing a processing sequence of the printing system according to the embodiment of the present invention.
Figure 24:
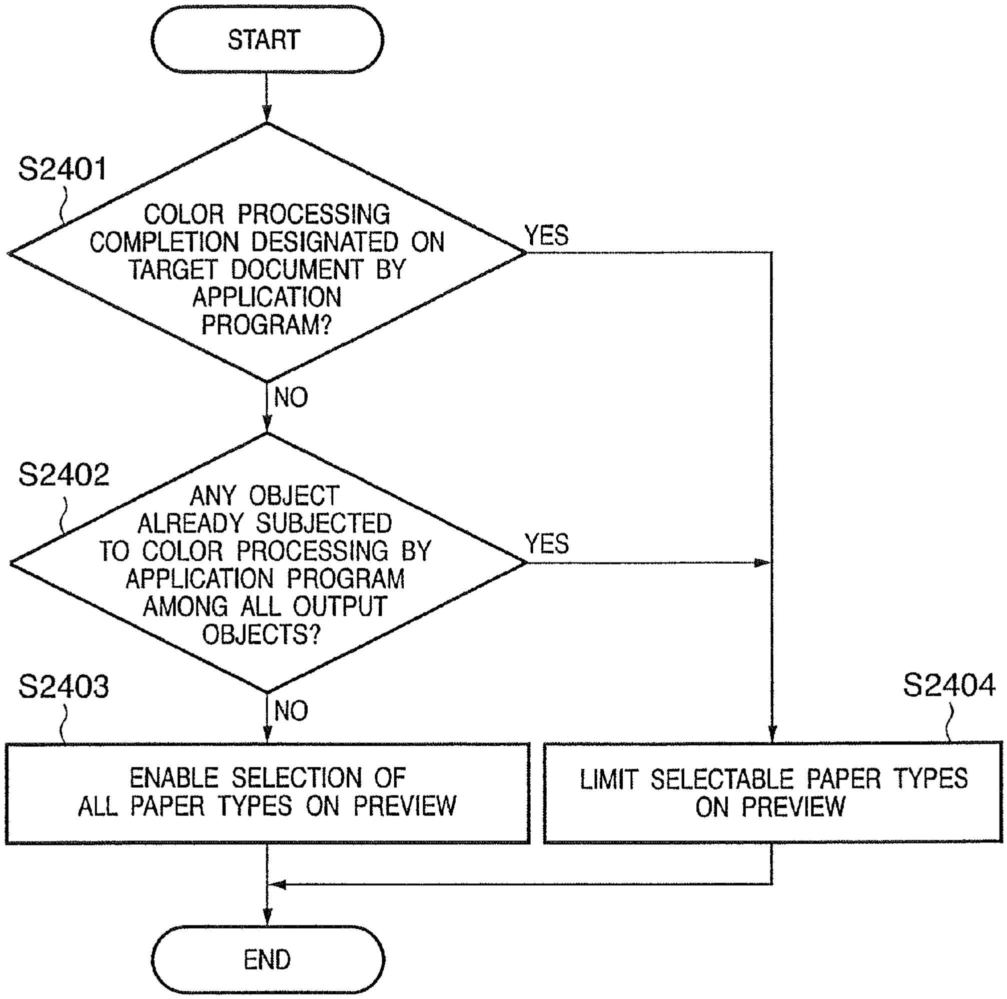
FIG. 24 is one example of a flowchart describing an operation of the printing system (for determining whether or not color processing has been completed)

Preview processing is executed in the mostly similar procedure to that of FIG. 11. However, part of the procedure is different. In the first to third embodiments, limitation of options at the time of changing the print setting on the preview is performed by obtaining options from the user interface driver 203. However, in the present embodiment, as shown in FIG. 24, options of setting values are generated by the printer graphics driver 206 along with the preview image data and stored in the preview file 209. In the procedure 1120 and 1121 in FIG. 11, a list of options is generated based on the option list information acquired from the user interface driver 203 and option limitation data read from the preview file 209. Based on the generated list of options, the previewer 208 displays options of an item that is about to be changed.

<Generating Option List Information by Printer Graphics Driver>

FIG. 24 is a flowchart for determining by the printer graphics driver 206 whether or not color processing has been performed by an application program, in a case where color processing is to be performed by the OS (GDI 202) upon preview displaying. This processing is executed along with image data generation in preview image data generation 1112 in FIG. 11. Color processing can be performed by the application program 201, the GDI 202 or the printer graphics driver 206. In order to avoid redundant color processing, when the application program 201 performs color processing, it is necessary to prohibit color processing by the GDI 202 or the printer graphics driver 206.

In order for the application program 201 to prohibit color processing by the GDI 202 or the printer graphics driver 206, the information (color processing completion data) indicating that color processing has already been completed and that further processing is prohibited can be set (1) in units of document subjected to printing or (2) in units of rendering object. To designate color processing completion data in units of document by the application program 201, color processing completion data is written in user setting data upon start of printing. The user setting data is data for notifying the operating system or the printer graphics driver 206 of the print setting set by the application program, such as a paper size. The user setting data includes public data defined inside the OS and private data defined for each printer graphics driver 206. In some OS, public data does not define designation of whether or not color processing has been performed (color processing completion data) by the application program 201. Therefore, it is effective in using many OS to be able to designate color processing completion data by private data also. Meanwhile, to designate color processing completion data in units of object, color processing completion data is provided to each object, and information indicating that color processing has been performed by an application program is also designated.

In step S2401 in FIG. 24, when the printer graphics driver 206 is initialized (upon start of processing), the driver 206 refers to color processing data of the application program in the user setting data and determines whether or not the application program 201 has designated color processing completion with respect to the entire document.

If color processing completion is not designated with respect to the entire document, then in step S102, all the output objects are checked to determine whether or not there is an object in which color processing completion data has been designated by the application program 201. The determination method differs depending on how the OS works. For instance, in a case of an OS which outputs a rendering command of the application program 201 through the printer graphics driver 206, the OS refers to color processing data in all rendering commands at the time of generating preview image data to determine whether or not there is an object in which color processing completion has been designated by the application program. In a case of an OS in which the printer graphics driver 206 can directly refer to a spool file such as the EMF spool file 204 where the rendering commands of the application program 201 are stored, the EMF spool file 204 is referred to determine whether or not there is an object in which color processing completion has been designated by the application program. Note that the determination is made for each page if the paper type setting is changed in units of page, whereas the determination is made for each document if the paper type setting is changed in units of document. Assuming a case of determining in units of page, if there is a rendering command in the page where color processing completion has been designated, it is determined that the page has already been subjected to color processing by the application program 201. If there is no rendering command where color processing completion has been designated, it is determined that the page has not been subjected to color processing.

If NO in step S2401 or S2402, i.e., if it is determined that the printing data has not been subjected to color processing by the application program 201, option information that enables selection of all paper types on the preview is stored in the preview file 209 in step S2403.

Meanwhile, if YES in step S2401 or S2402, i.e., if it is determined that the printing data has already been subjected to color processing by the application program 201, in step S2404, option list information is stored in the preview file 209 to enable selection of setting values within the scope of utilizing the common color profile with the paper type setting value currently selected on the preview. The printer graphics driver 206 refers to, e.g., the setting value and profile correspondence table 2301 shown in FIG. 23 to retrieve a color profile corresponding to the current setting value, for instance, "plain paper," and stores in the preview file 209 the setting values of paper types included in the retrieved entry as the option information indicating the selectable scope.

When pull-down display operation is performed on the selection area 402, the previewer 208 displays setting values of selectable paper types based on the option list information stored in the preview file 209, and the control ends. The processing performed in a case where a setting value is changed or printing start is designated is the same as the first embodiment.

According to the above-described configuration and procedures of the present embodiment, when a print setting of printing data is changed after printing is requested on the printing data generated by an application program, it is determined whether or not the printing data has already been subjected to color processing by the application program, and if so determined, options in each print setting item are limited so that options other than the one utilizing the same color parameter as the one utilized in the color processing cannot be selected. Accordingly, even if a print setting is changed, the image can be printed with accurate colors.

[Modification]

Note that the present invention is not limited to the present embodiment and various modifications can be made. For instance, the above embodiment has described a case where a color profile changes only in accordance with the paper type. However, assuming that a color profile changes in accordance with binarization processing, if binarization processing is changed on the preview, the limitation similarly applies to the binarization processing.

Fifth Embodiment

According to the preview method described in the fourth embodiment, in a case where color processing is performed on printing data by the GDI 202 in the OS, the printing data is transmitted to the printer 207 again through the GDI 202 after a preview is displayed. According to a preview method of the present embodiment, printing data is not transmitted through the GDI 202 after a preview is displayed. The difference between the fourth and fifth embodiments is mainly described.

<Functional Configuration of Printing System 100>

Figure 25:
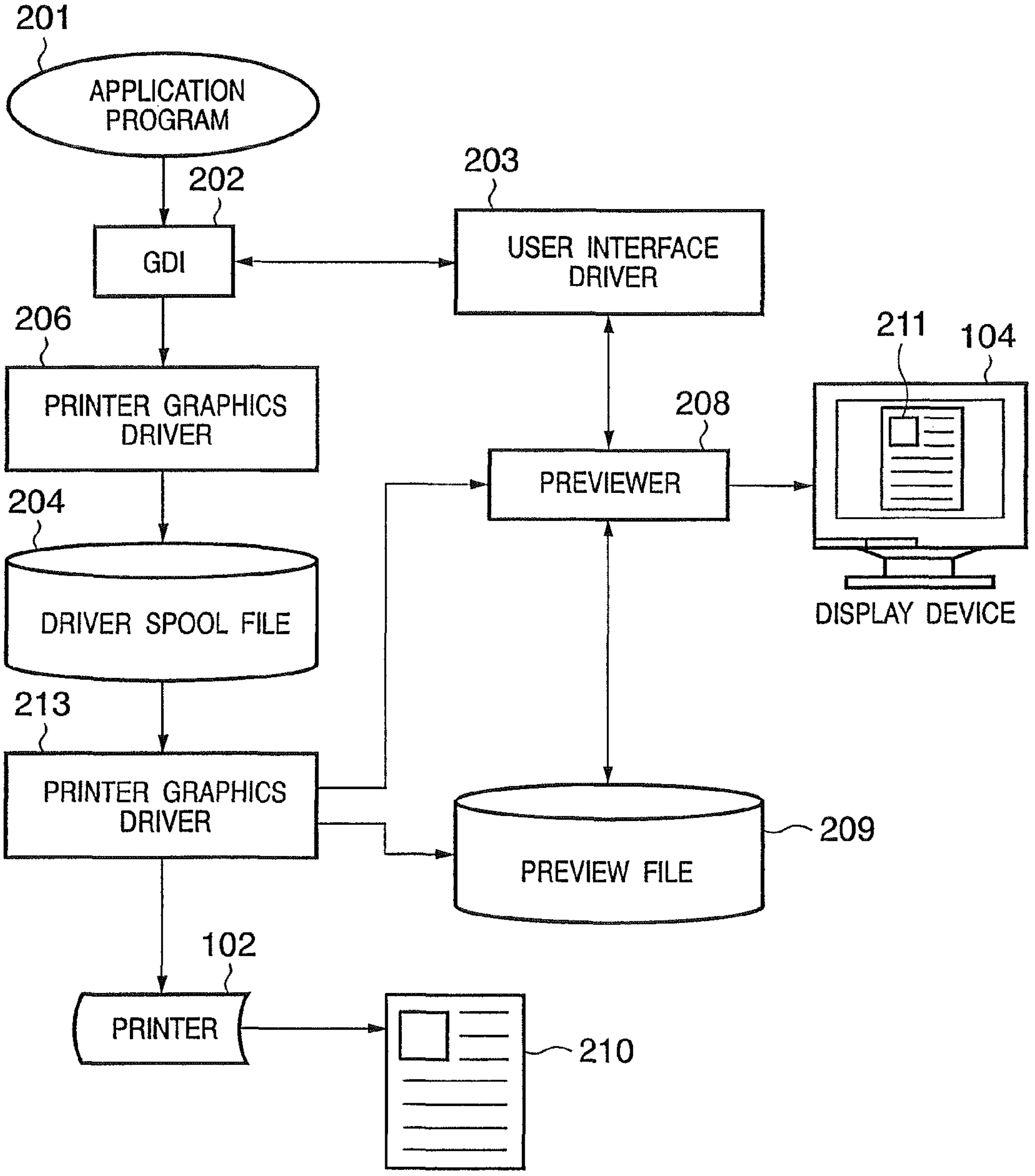
FIG. 25 is a block diagram showing another example of a functional configuration of the printing system.

FIG. 25 is a block diagram of a printing system according to the present embodiment, showing in particular the printing control function among functions of the printing system 100 realized by executing a predetermined processing program by the host computer 101. According to the printing control function of the host computer 101 in the first to fourth embodiments, document data (printing data) generated by the application program 201 and print setting data are stored in the EMF spool file 204 through the GDI 202. On the contrary, in the present embodiment, the GDI 202 does not generate a spool file, but the printer graphics driver 206 stores printing data in a spool file called a driver spool file 213.

The printer graphics driver 206 generates preview image data for print preview displaying or printing image data based on the data stored in the driver spool file 213. When preview image data is generated, the printer graphics driver 206 starts up the previewer 208 and notifies the previewer 208 of the preview file name to perform previewing.

Meanwhile, when printing image data is generated, the printer graphics driver 206 supplies the printer 102 with the printing image data through an arbitrary data transmission unit (not shown).

<Operation of Printing System 100>

Described below is a procedure of determining whether the previewer 208 displays the display screen 500 shown in FIG. 5 or the display screen 2700 shown in FIG. 27. For this, contents of option list information to be transferred to the previewer 208 are determined. In the configuration shown in FIG. 25, data in the driver spool file 213 is outputted to the printer 207 without being transferred through the GDI 202 after a preview is displayed. Therefore, in addition to the case where color processing such as color management is performed by the application program 201, also in a case where color processing is performed by the GDI 202, color processing cannot be performed again in accordance with a change in the paper type on a preview. Therefore, paper type limitation is necessary.

Figure 26:
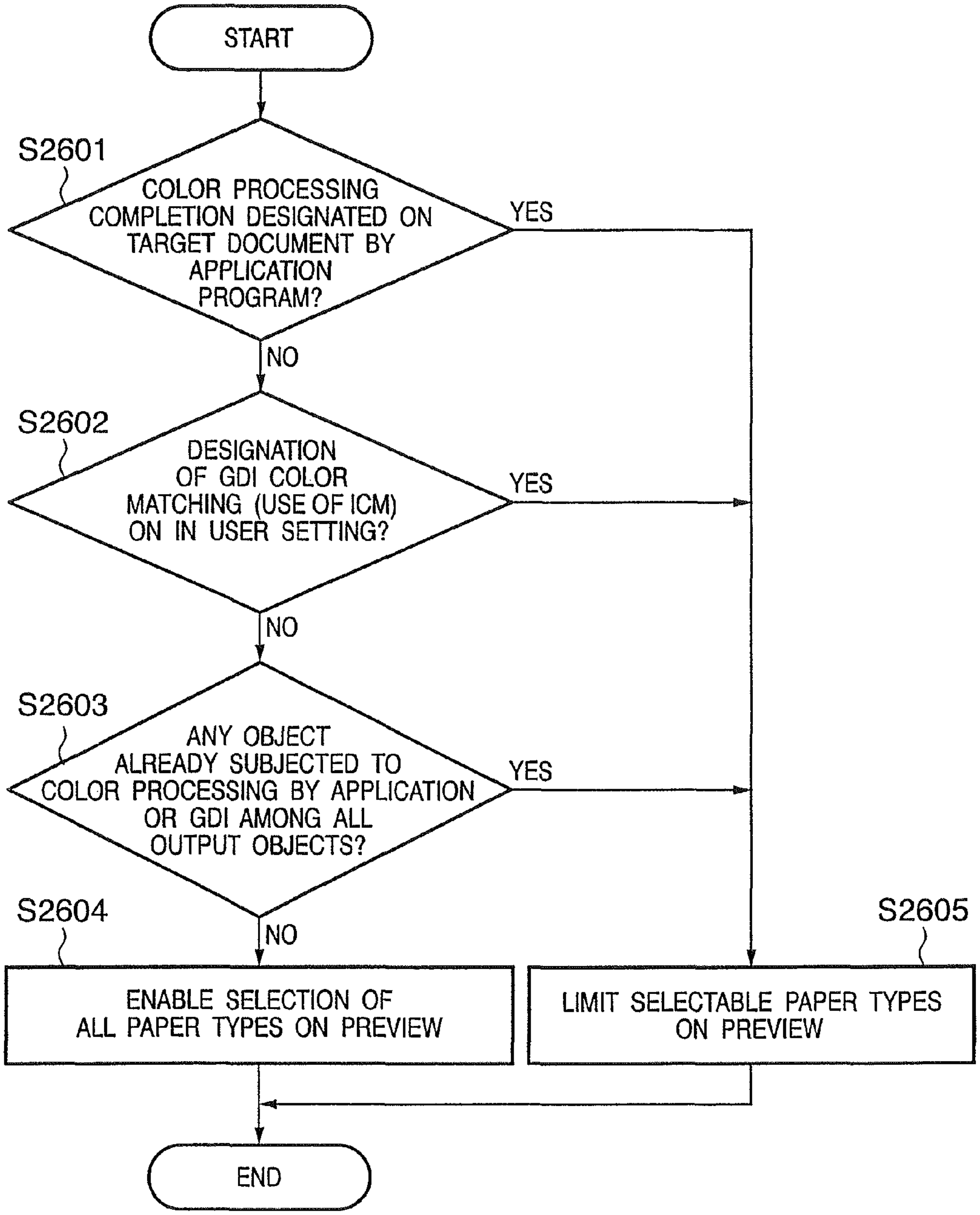
FIG. 26 is another example of a flowchart describing an operation of the printing system (for determining whether or not color processing has been completed)

FIG. 26 is a flowchart for determining by the printer graphics driver 206 whether or not color processing has been performed by the application program, in a case where color processing is performed by the OS (GDI 202) after a preview is displayed. The processing in FIG. 26 is executed by the printer graphics driver 206, in place of the processing in FIG. 24 described in the fourth embodiment.

Color processing can be performed by the application program 201, the GDI 202 or the printer graphics driver 206. In order to avoid redundant color processing, when the application program 201 or the GDI 202 performs color, processing, it is necessary to prohibit color processing by the printer graphics driver 206.

Besides color processing of the GDI 202 can be designated by the application program 201, it can also be designated by a user through user setting of the user interface driver 203. For instance, the user can select "use ICM" on the user interface screen displayed by the user interface driver 203. When "use ICM" is designated, color processing is performed by the GDI 202. The user setting values set by the user interface driver 203 are transferred to the application program 201 through the GDI 202. When printing is requested, the application program 201 outputs the user setting values to the printer graphics driver 206. The application program 201 can transfer the user setting values to the printer graphics driver 206 by utilizing the user setting data described in the fourth embodiment.

In step S2601, the printer graphics driver 206 refers to the color processing data of the application program in the user setting data to determine whether or not the application program 201 has designated color processing completion with respect to the entire document.

If NO in step S2601, the printer graphics driver 206 determines whether or not designation of GDI color matching is ON in step S2602. The determination in step S2602 is made by determining whether or not the user setting value "use ICM" set by the user interface driver 203 is ON.

If the user setting value "use ICM" is OFF, it is determined that designation of GDI color matching is not ON. Then, the control proceeds to step S2603. In step S2603, it is determined whether or not there is an object that has already been subjected to color processing by the application program 201 or the GDI 202 in all the output objects. As mostly similar to step S2402 in FIG. 24, the color processing data in all rendering commands are referred at the time of generating the preview file 209, and it is determined in units of document or in units of page whether or not there is an object in which color processing completion has been designated by the application program 201 or the GDI 202. Note, also to the object that has been subjected to color processing by the GDI, information indicative of "color processing completion" is attached, as similar to the one performed by the application program. This information may be in common with the color processing by the application program, or may be different.

If NO in step S2601, S2602, or S2603, i.e., if it is determined that the printing data has not been subjected to color processing by the application program 201 or the GDI 202, option information that enables selection of all paper types on the preview is stored in the preview file 209 in step S2604.

Meanwhile, if YES in step S2601, S2602, or S2603, i.e., if it is determined that the printing data has already been subjected to color processing by the application program 201 or the GDI 202, in step S2605, option list information is stored in the preview file 209 to enable selection of setting values within the scope of utilizing the common color profile with the paper type setting value currently selected on the preview. The printer graphics driver 206 refers to, e.g., the setting value and profile correspondence table 2301 shown in FIG. 23 to retrieve a color profile corresponding to the current setting value, for instance, "plain paper" and stores in the preview file 209 the setting values of paper types included in the retrieved entry as the option information indicating the selectable scope.

When pull-down display operation is performed on the selection area 402, the previewer 208 displays setting values of selectable paper types based on the option list information stored in the preview file 209, and the control ends. The processing performed in a case where a setting value is changed or printing start is designated is the same as the first embodiment.

According to the above-described configuration and procedures of the present embodiment, when a print setting of printing data is changed after printing is requested on the printing data generated by an application program, it is determined whether or not the printing data has already been subjected to color processing by the application program or the OS, and if so determined, options in each print setting item are limited so that options other than the one utilizing the same color parameter as the one utilized in the color processing cannot be selected. Accordingly, even if a print setting is changed, the image can be printed with accurate colors.

Each of the above-described fourth and fifth embodiments can be combined with any of the first to third embodiments.

According to the present invention, when a print preview is displayed, it is possible to confirm, together with the print result, contents of the print setting set by a user using an application program or the like.

Furthermore, a print setting can be changed without terminating the print processing, and printing can be executed with the changed print setting.

Moreover, in accordance with the current print-setting contents, a user is provided with options that can be selected upon making a change in the print setting. Therefore, it is possible to prevent an erroneous change in the setting.

Furthermore, when there is a setting item whose value should be changed in accordance with a change in other setting contents, the value of the setting item is changed to an appropriate value, thereby preventing an erroneous change in the setting.

Still further, with respect to a print setting item whose value has already been reflected on the print-target document data in the print preview stage, options of setting values are limited to a range that does not require another reflection of a setting value, so as to prevent such state where a change in the print setting is not reflected on the print result.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-188380 filed on Jun. 25, 2004, which is hereby incorporated by reference herein.

What is claimed is:

1. A print control apparatus, comprising:

a determination unit which determines whether or not color processing using a color profile corresponding to a current choice of a predetermined item has been applied to a document data;

a display unit which, when it is determined by the determination unit that the color processing has been applied to the document data, displays a user interface in which a choice using the same color profile used by the color processing applied to the document data is displayed as a selectable object for the predetermined item, and in which a choice using a color profile different from the color profile used by the color processing applied to the document data is not displayed as the selectable object for the predetermined item;

a receiving unit which receives a print start instruction via the user interface displayed by the display unit; and a generation unit which generates print data in response to the print start instruction received by the receiving unit.

2. The apparatus according to claim 1, wherein the predetermined item is a paper type.

3. The apparatus according to claim 1, further comprising a storage unit which stores association information for associating a choice of the predetermined item with a color profile.

4. A print control method which is performed by a print control apparatus, the method comprising the steps of:

determining whether or not color processing using a color profile corresponding to a current choice of a predetermined item has been applied to a document data;

when it is determined in the determining step that the color processing has been applied to the document data, displaying a user interface in which a choice using the same color profile used by the color processing applied to the document data is displayed as a selectable object for the predetermined item, and in which a choice using a color profile different from the color profile used by the color processing applied to the document data is not displayed as the selectable object for the predetermined item;

receiving a print start instruction via the user interface displayed in the displaying step; and generating print data in response to the print start instruction received in the receiving step.

5. The method according to claim 4, wherein the predetermined item is a paper type.

6. The method according to claim 4, further comprising a step of storing association information for associating a choice of the predetermined item with a color profile.

7. A non-transitory computer readable medium on which is stored a program for causing a computer to execute a print control method, the method comprising the steps of:

determining whether or not color processing using a color profile corresponding to a current choice of a predetermined item has been applied to a document data;

when it is determined in the determining step that the color processing has been applied to the document data, displaying a user interface in which a choice using the same color profile used by the color processing applied to the document data is displayed as a selectable object for the predetermined item, and in which a choice using a color profile different from the color profile used by the color processing applied to the document data is not displayed as the selectable object for the predetermined item;

receiving a print start instruction via the user interface displayed in the displaying step; and generating print data in response to the print start instruction received in the receiving step.

8. The medium according to claim 7, wherein the predetermined item is a paper type.

9. The medium according to claim 7, wherein the method further comprises a step of storing association information for associating a choice of the predetermined item with a color profile.

* * * * *